United States Patent
Fukasawa

(10) Patent No.: US 10,185,723 B2
(45) Date of Patent: Jan. 22, 2019

(54) INFORMATION PROCESSING APPARATUS, METHOD OF CONTROLLING THE SAME, AND STORAGE MEDIUM

(71) Applicant: CANON KABUSHIKI KAISHA, Tokyo (JP)

(72) Inventor: Yusuke Fukasawa, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 429 days.

(21) Appl. No.: 14/953,921

(22) Filed: Nov. 30, 2015

(65) Prior Publication Data

US 2016/0162481 A1 Jun. 9, 2016

(30) Foreign Application Priority Data

Dec. 5, 2014 (JP) .................................. 2014-247316

(51) Int. Cl.
*G06F 17/30* (2006.01)
(52) U.S. Cl.
CPC .... *G06F 17/3012* (2013.01); *G06F 17/30126* (2013.01)
(58) Field of Classification Search
CPC combination set(s) only.
See application file for complete search history.

(56) References Cited

U.S. PATENT DOCUMENTS

| 7,634,141 | B2 * | 12/2009 | Hayashi | G06F 17/3028 348/333.01 |
| 2007/0027892 | A1 * | 2/2007 | Sakaniwa | G06F 17/30067 |
| 2009/0327880 | A1 * | 12/2009 | Ide | G06F 17/2735 715/261 |
| 2011/0134462 | A1 * | 6/2011 | Suto | H04N 1/4406 358/1.14 |
| 2012/0209775 | A1 * | 8/2012 | Milne | G06Q 10/101 705/44 |
| 2014/0337766 | A1 * | 11/2014 | Arad | G06Q 10/107 715/753 |

FOREIGN PATENT DOCUMENTS

| JP | 2002064534 A | 2/2002 |
| JP | 2006072892 A | 3/2006 |
| JP | 2006209662 A | 8/2006 |
| JP | 2011237983 A | 11/2011 |
| JP | 2012014590 A | 1/2012 |

OTHER PUBLICATIONS

Office Action issued in Japanese Appln. No. 2014-247316 dated Jul. 6, 2018.

* cited by examiner

*Primary Examiner* — Etienne P Leroux
(74) *Attorney, Agent, or Firm* — Rossi, Kimms & McDowell LLP

(57) ABSTRACT

An image file naming rule is set by setting each of a plurality of items that configure a file name, and it is determined whether or not any one of the plurality of items satisfies a predetermined condition. If it is determined that none of the plurality of items satisfies the predetermined condition, an item including information that satisfies the predetermined condition is added to the file name.

10 Claims, 18 Drawing Sheets

| | DESTINATION ID (601) | REGISTRATION NAME (602) | TELEPHONE NUMBER (603) | ADDRESS BOOK NAME (607) |
|---|---|---|---|---|
| 604 | 00100 | ABC TRADING | 0334344545 | MR A |
| 605 | 00101 | Zmarketing | 0343295054 | MR B |
| 606 | 00102 | K BUSSAN | 0385498854 | MR C |
| | ... | ... | ... | |

701 — hostname,sharedserver
702 — folderpath,root/
703 — username,administrator
704 — password,32942xc45
705 — filenamerule,[REGISTNAME]_[FAXNUMBER]_[DATE]
706 — foldernamerule, [REGISTNAME]/[FAXNUMBER]/[DATE]

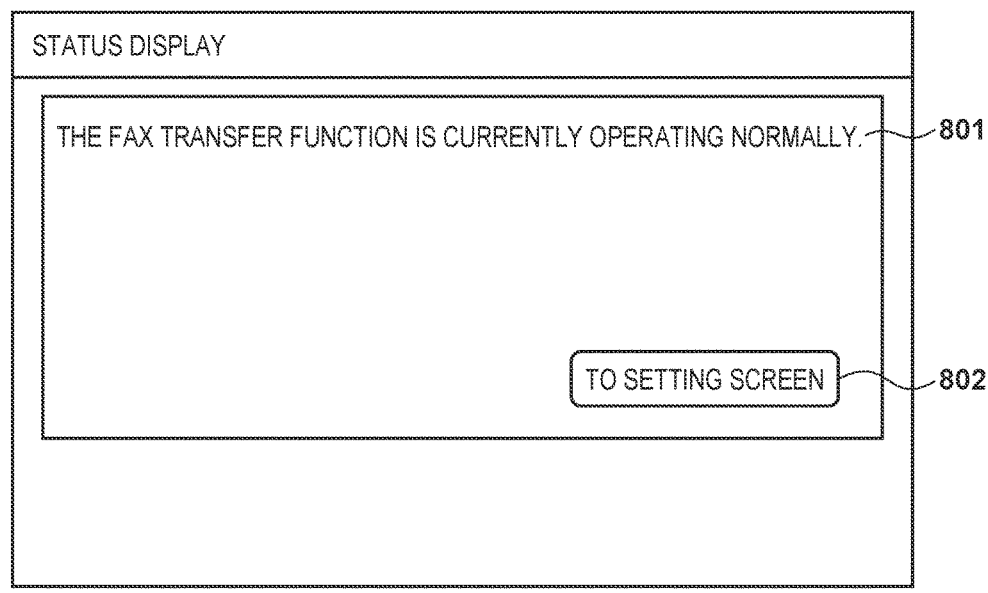
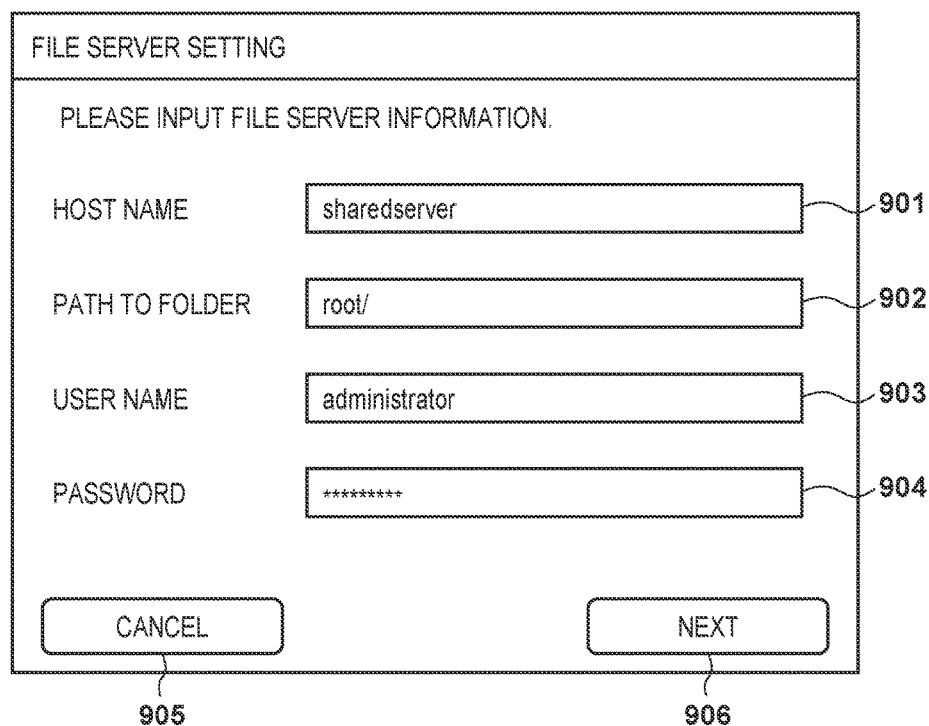

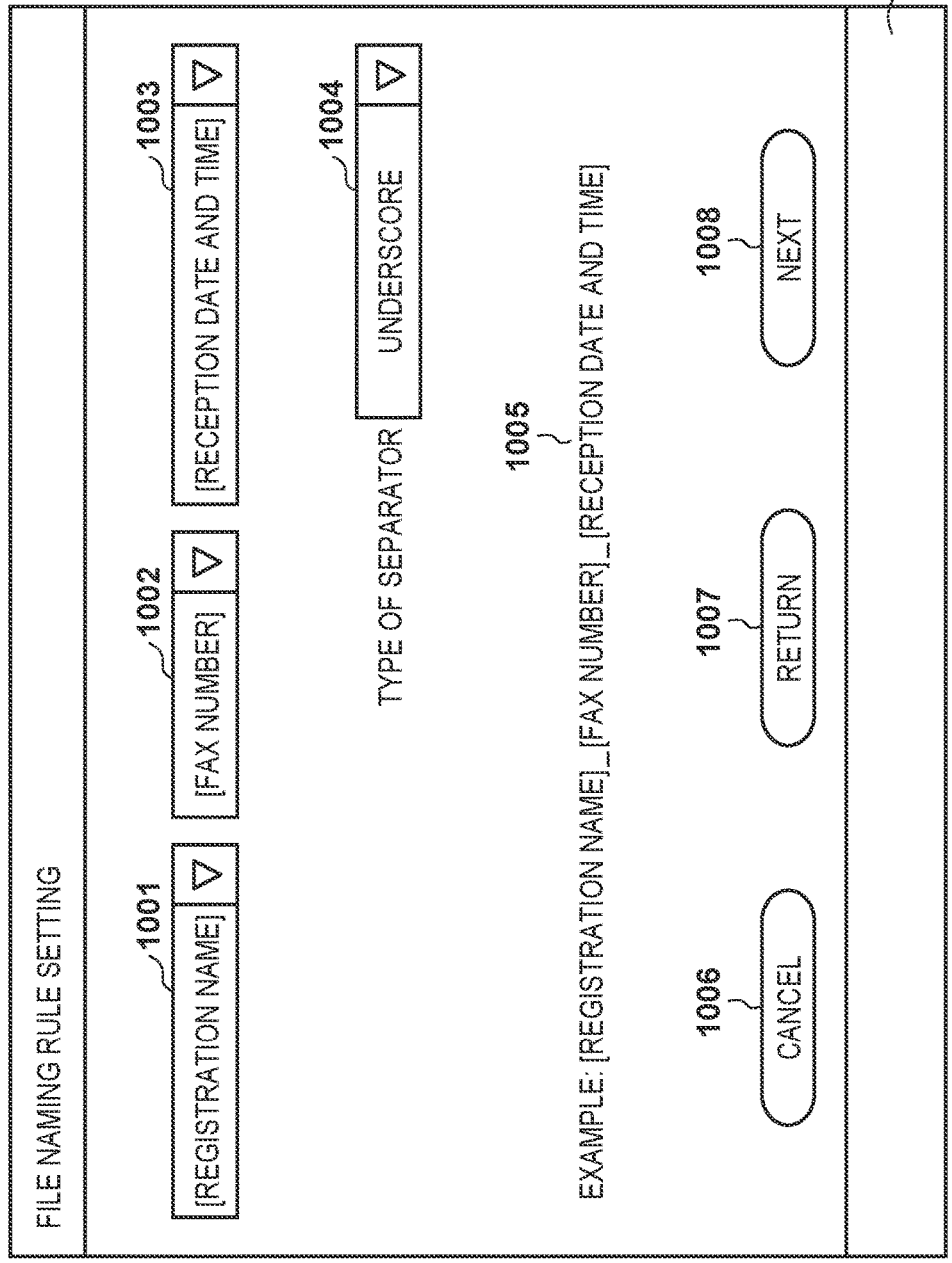

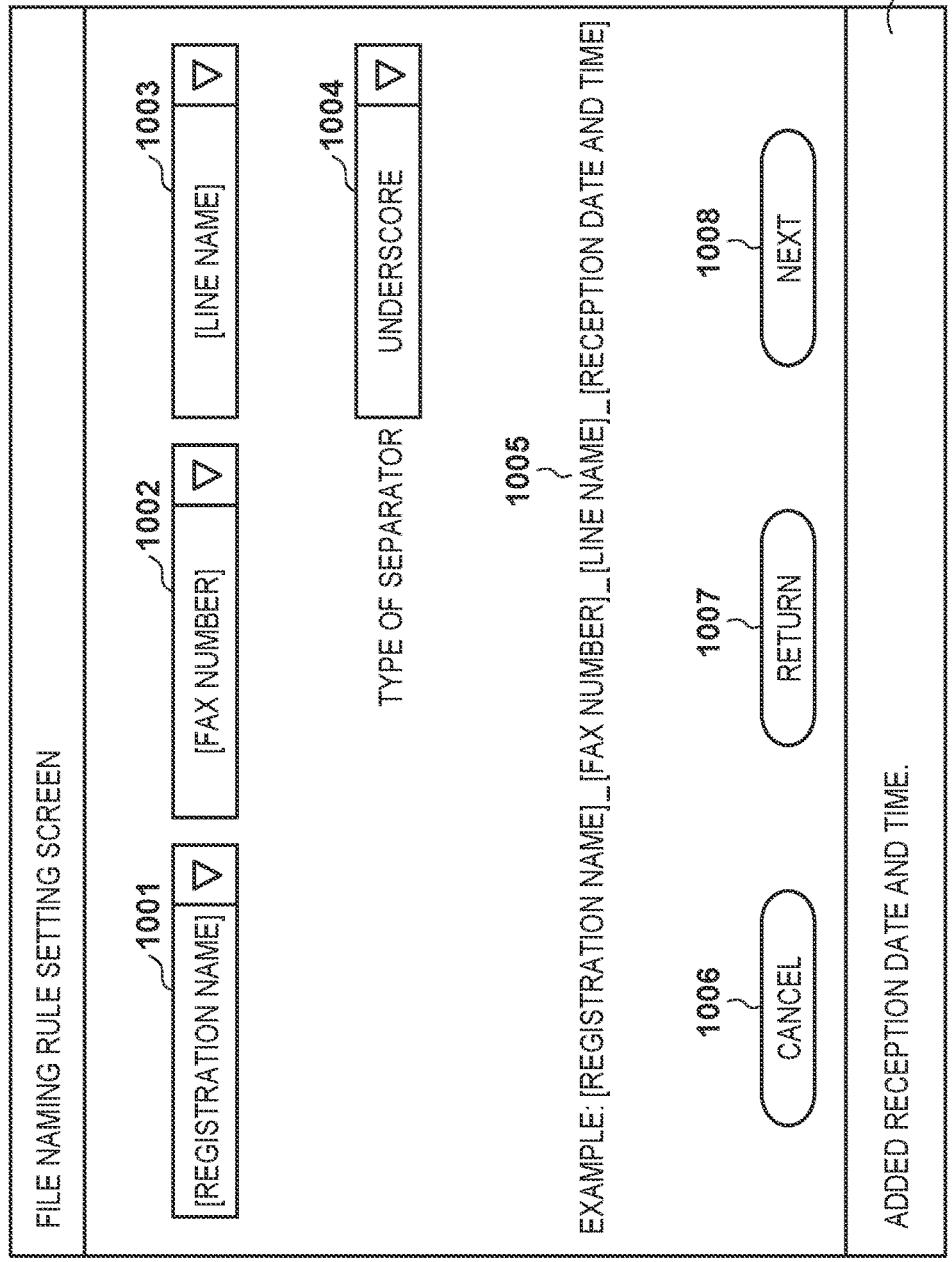

F I G. 17
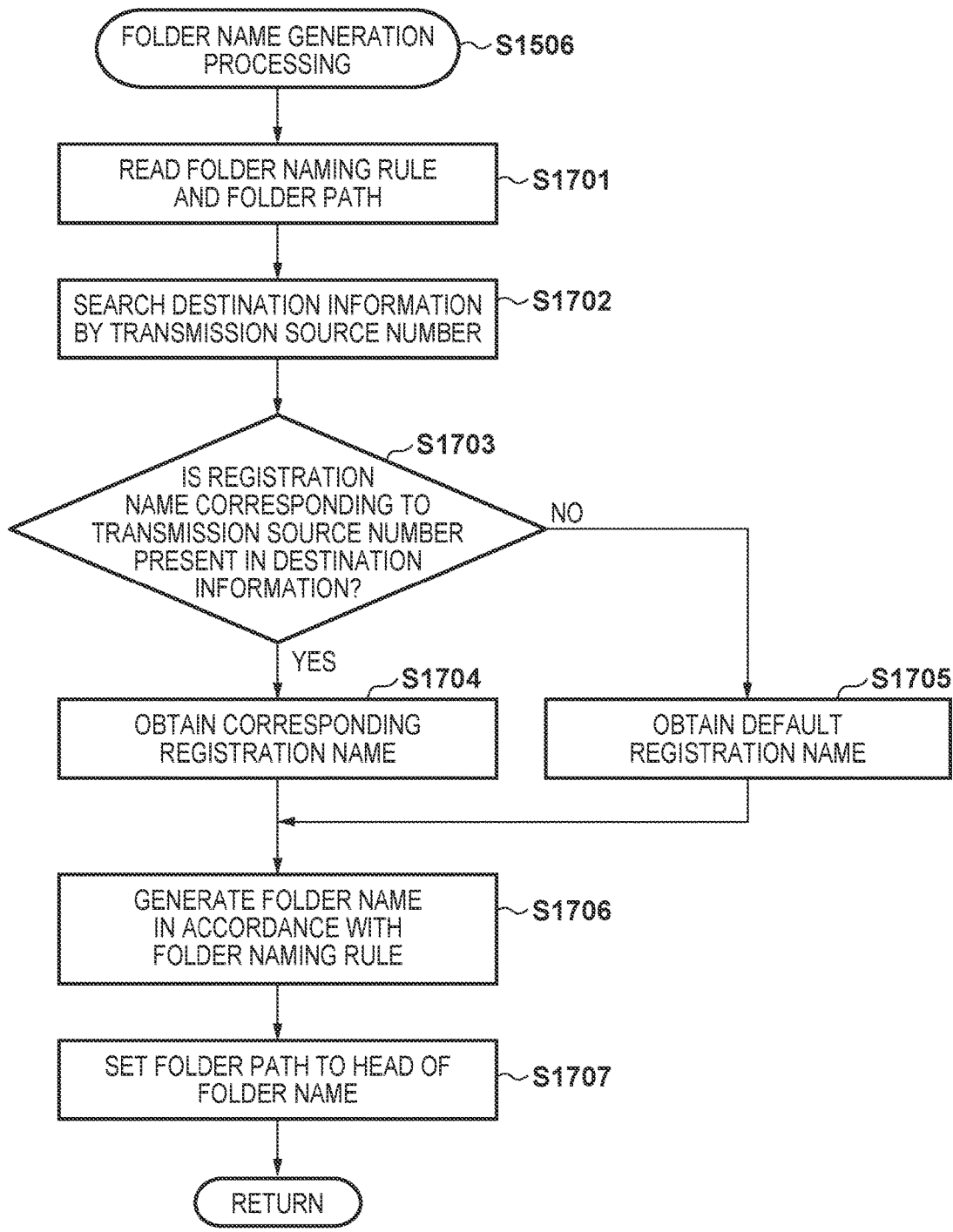

FIG. 20

FILE NAMING RULE INPUT

[REGISTRATION NAME]_[FAX NUMBER]_[RECEPTION DATE AND TIME] ~2001

BACKSPACE   ALPHABET 1 2 3 4 5 6 7 8 9 0 - ^ ¥
q w e r t y u i o p @ [ ]
a s d f g h j k l ; : ↓
z x c v b n m , . / ¥
SHIFT   SPACE

CANCEL ~2003   OK ~2002

INFORMATION PROCESSING APPARATUS, METHOD OF CONTROLLING THE SAME, AND STORAGE MEDIUM

BACKGROUND OF THE INVENTION

Field of the Invention

The present invention relates to an information processing apparatus, a method of controlling the same, and a storage medium.

Description of the Related Art

In work using fax, a fax document received by an MFP, a fax, or the like, is digitized using a scan function of an MFP, a document scanner, or the like, and stored in a file server, or the like. Here MFP is an abbreviation of Multi Function Peripheral, and is an example of an image forming apparatus that has a plurality of functions, such as a copying machine, a scanner, and a fax. In this case, to allow optimization of work to digitize and store to a file server, a received facsimile transfer system that digitizes a fax document, and automatically stores the result in a file server in accordance with an attribute of the fax document is constructed. In such a system, a file name is generated in accordance with a telephone number of a transmission source or other attribute information of the received fax document, and stored in the file server. Here, if the file name is duplicated, a new fax document will overwrite an existing fax document, and so there is the possibility of a fax document that was stored disappearing.

According to Japanese Patent Laid-Open No. 2002-64534, for example, a technique of storing a fax document that the FAX server received, adding a unique identification number as the file name, is recited as a strategy for handling this kind of disappearance of a fax document that is stored. Using the technique recited in Japanese Patent Laid-Open No. 2002-64534, because an identification number unique to a communication network or an identification number unique inside the FAX server is used as the file name of the fax document, a unique file name can be generated, and data loss due to duplication of file names can be prevented.

However, with the technique disclosed in the above described Japanese Patent Laid-Open No. 2002-64534, because a system side forcibly adds a unique identification number as the file name, visibility for a user is degraded. Therefore, when a user uses the stored fax document, there is a problem that identifying a desired fax document is difficult and it is difficult to search for a desired document.

SUMMARY OF THE INVENTION

An aspect of the present invention is to eliminate the above-mentioned problems which are found in the conventional technology.

A feature of the present invention is to provide a technique by which a file name that is unique and that increases user visibility can be set.

The present invention in its first aspect provides an information processing apparatus, comprising: a setting unit configured to set an image file naming rule by setting each of a plurality of items that configure a file name; a determination unit configured to determine whether or not any one of the plurality of items set by the setting unit satisfies a predetermined condition; and an addition unit configured to, if the determination unit determines that none of the plurality of items satisfies the predetermined condition, add an item including information that satisfies the predetermined condition to the file name.

The present invention in its second aspect provides a method of controlling an information processing apparatus, the method comprising: setting an image file naming rule by setting each of a plurality of items that configure a file name; determining whether or not any one of the plurality of items satisfies a predetermined condition; and if it is determined that none of the plurality of items satisfies the predetermined condition, adding an item including information that satisfies the predetermined condition to the file name.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 depicts a view for illustrating an example of a status display screen displayed on a console unit of the MFP according to the first embodiment.

FIG. 9 depicts a view for illustrating an example of a file server setting screen that the MFP according to the first embodiment displays.

FIG. 10A depicts a view for illustrating an example of a setting screen for setting a file naming rule that the MFP according to the first embodiment displays.

FIG. 10B depicts a view for illustrating an example of a setting screen for setting a file naming rule in a case where an item that becomes unique is not designated by a user.

FIG. 17 is a flowchart for describing folder name generation processing in step S1506 of FIG. 15 of the file server on which the image file transferred is stored.

FIG. 20 depicts a view for illustrating an example of a free input screen according to a second embodiment of the present invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

[First Embodiment]

Firstly, explanation will be given for a first embodiment according to the present invention. In the first embodiment, explanation is given for an example of fax document transfer setting processing and fax reception accompanying file transfer processing, in a system including an MFP as an example of an image forming apparatus of the present invention and a file server having a file storage function.

Figure 1:
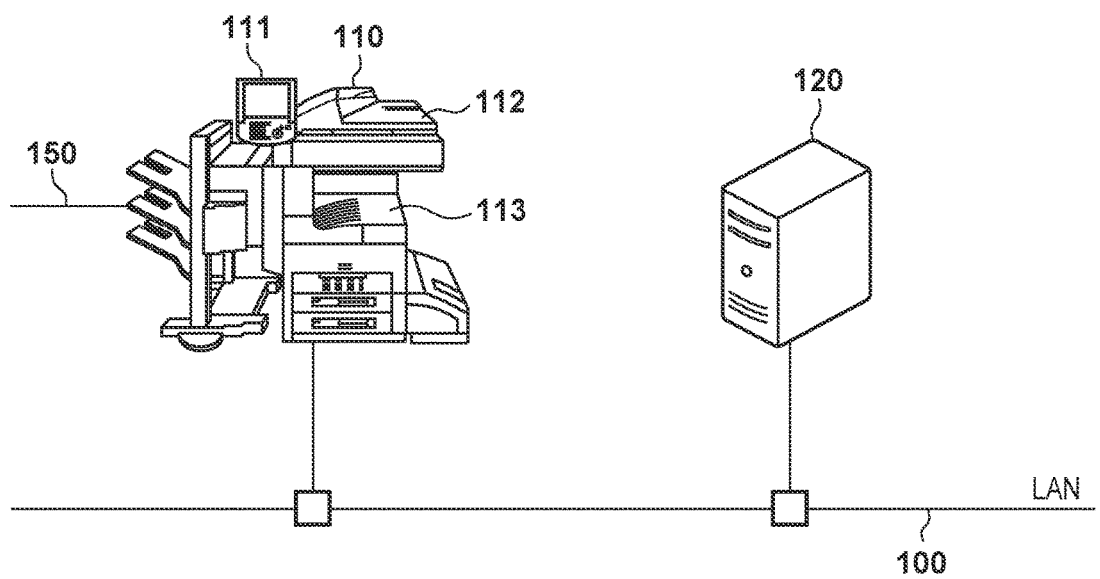
FIG. 1 depicts a view for illustrating an overall configuration of an information processing system according to a first embodiment of the present invention.

FIG. 1 depicts a view for illustrating an overall configuration of an information processing system according to a first embodiment of the present invention.

In this information processing system, an MFP 110 and a file server 120 are connected via a LAN 100.

The MFP 110 is a multi-function peripheral (multi-function processing apparatus) having a console unit 111, a scanner unit 112 and a printer unit 113, and is capable of connecting to a telephone public circuit network 150 and of fax reception. In the information processing system according to the first embodiment, the MFP 110 is used as a receiving terminal for fax documents. The file server 120 stores and manages a received file with a designated file name and a folder name and performs authentication of a terminal connected to the LAN 100. However, the system according to the first embodiment is not limited to the number of devices configured in FIG. 1. For example, by having the function of the file server within the MFP 110, the MFP and the file server may be configured in the same apparatus. Also, the file server may be configured as a server on the Internet, or as a cloud system.

Figure 2:
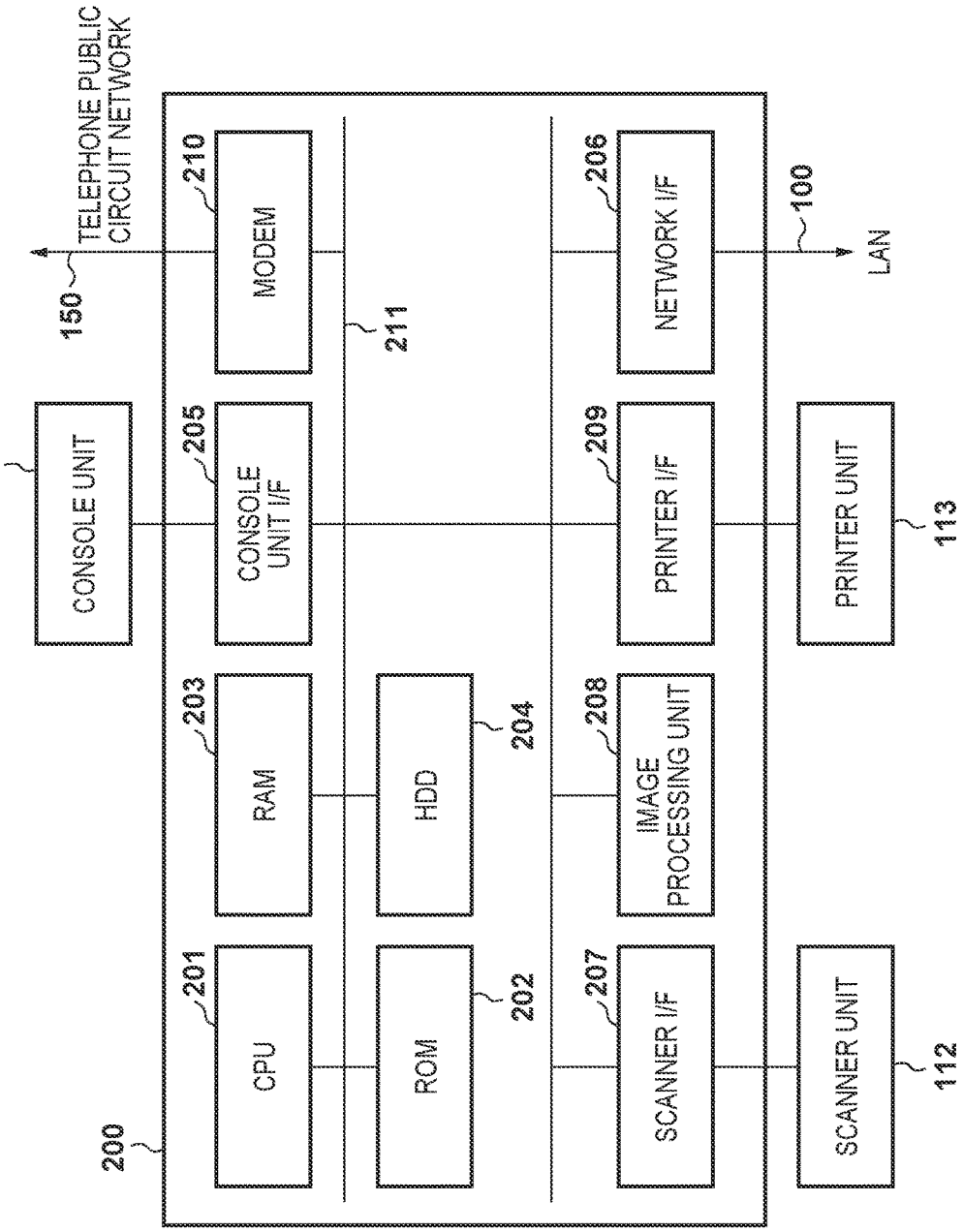
FIG. 2 is a block diagram for explaining a hardware configuration of an MFP according to the first embodiment.

FIG. 2 is a block diagram for explaining a hardware configuration of the MFP 110 according to the first embodiment.

The console unit 111 comprises a display unit having a touch panel function, various hard keys, or the like, and according to data from a control unit 200 displays information to a user or inputs information in response to a user operation to the control unit 200. The scanner unit 112 reads images of originals, generates image data for the images, and supplies the image data to the control unit 200. The printer unit 113 prints images onto sheet (sheets of paper, etc.) based on the image data received from the control unit 200.

The control unit 200 is connected electrically to the console unit 111, the scanner unit 112, and the printer unit 113, and is connected to the LAN 100 via a network interface (I/F) 206. With this, communication is possible by a communication protocol such as TCP/IP via the LAN 100. In the control unit 200, a CPU 201 is connected to a ROM 202, a RAM 203, an HDD 204, a console unit I/F 205, a network I/F 206, a scanner I/F 207, an image processing unit 208, and a printer I/F 209 through a system bus 211. The CPU 201 executes a boot program in the ROM 202, deploys an OS and control programs stored in the HDD 204 into the RAM 203, and controls the MFP 110 comprehensively in accordance with those programs. This control encompasses execution of programs for realizing the later described flowcharts. In the ROM 202, the boot program and various data of the MFP 110 are stored. The RAM 203 provides a work memory for the CPU 201 to operate, and provides an image memory for temporary storage of received image data, or the like. The HDD 204 is a hard disk drive, and stores an OS, various programs, and image data. The console unit I/F 205 is an interface unit for connecting the system bus 211 and the console unit 111. The network I/F 206 is connected to the LAN 100 and the system bus 211, and via the network (LAN) 100 performs input and output of information with devices connected to the network. The scanner I/F 207 controls an interface between the scanner unit 112 and the control unit 200. The image processing unit 208 performs image processing such as rotation, color conversion, and image compression/decompression processing with respect to image data input from the scanner unit 112 and image data output to the printer unit 113. The printer I/F 209 receives image data processed by the image processing unit 208, and controls printing by the printer unit 113 in accordance with attribute data attached to the image data. A modem 210 is connected to the telephone public circuit network 150 and the system bus 211, and performs fax transmission/reception with an external fax terminal (not shown) via the telephone public circuit network 150. Note that in the first embodiment, explanation is given for an example of the MFP 110, which is capable of a UI display using the console unit 111, but in place of the MFP 110, for example, an information processing apparatus such as a general-purpose computer, or some other image processing apparatus may be used.

Figure 3:
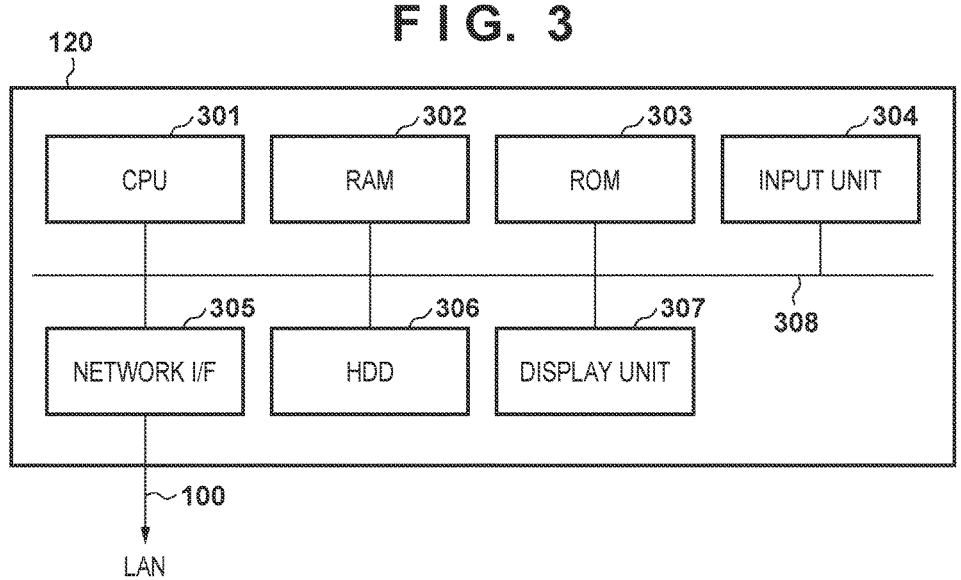
FIG. 3 is a block diagram for explaining a hardware configuration of a file server according to the first embodiment.

FIG. 3 is a block diagram for explaining a hardware configuration of the file server 120 according to the first embodiment.

The file server 120 comprises a CPU 301, a RAM 302, a ROM 303, an input unit 304, a network I/F 305, a hard disk drive (HDD) 306, and a display unit 307, which are connected communicably with each other through a system bus 308. The ROM 303 stores a boot program, and when powering on, the CPU 301 reads the boot program, and deploys an OS, control programs, or the like, which are installed in the HDD 306, into the RAM 302. Functions of the file server 120 are realized by the CPU 301 then executing programs deployed into the RAM 302. Also, the CPU 301 performs communication with other apparatuses on the LAN 100 that are connected via the network I/F 305. The input unit 304 includes a keyboard, a pointing device, or the like, and accepts instructions from a user. The display unit 307 performs display of menu screens, messages, or the like, to the user. Note that the display unit 307 may have a touch panel function.

Figure 4:
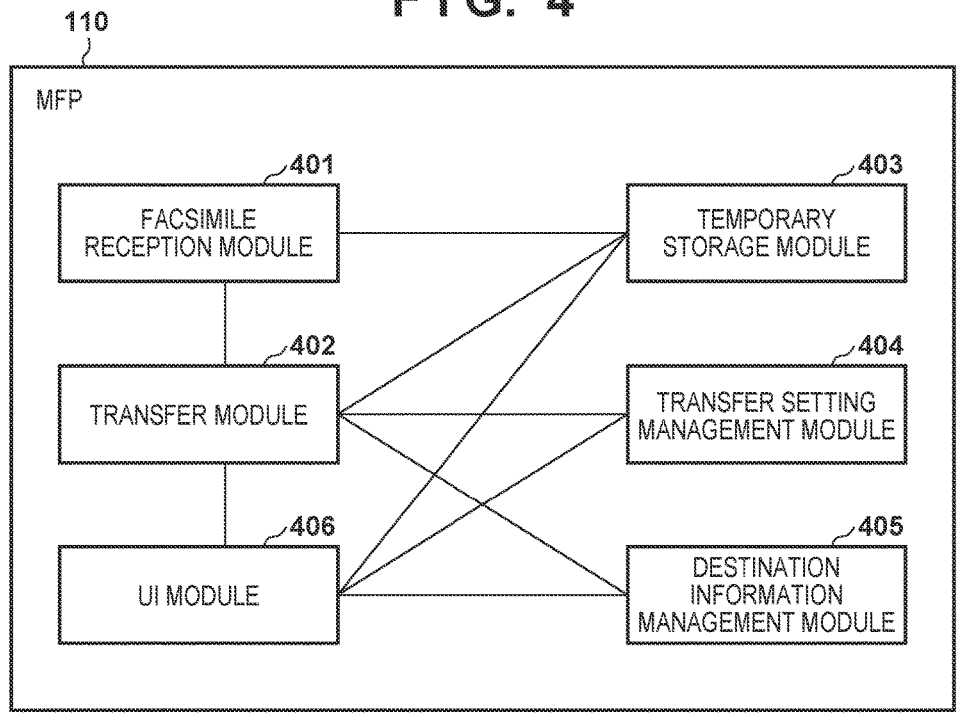
FIG. 4 is a functional block diagram for explaining a software module configuration of the MFP according to the first embodiment.

FIG. 4 is a functional block diagram for explaining a software module configuration of the MFP 110 according to the first embodiment. These software modules are installed on the HDD 204 of the MFP 110, and are executed under the control of the CPU 201 having been deployed into the RAM 203 upon execution.

A facsimile reception module 401 performs reception processing upon a fax reception by the modem 210. The facsimile reception module 401 receives facsimile data received through the modem 210, makes a fax document by conversion into a PDF or the like, and then saves the fax document to the HDD 204 as an image file by a temporary storage module 403. Also, the facsimile reception module 401 generates a control file including a reception date and time, which is a date/time at which fax reception is performed, and a transmission source number which is a telephone number of an external fax terminal (not shown) connected via the telephone public circuit network 150. Then, the control file, along with the image file (the fax document) are saved in the HDD 204. Note that in the embodiment the expression "fax document" is used, but "fax document" encompasses a typical image.

A transfer module 402 transfers an image file saved in the HDD 204 by the facsimile reception module 401 to the file server 120. At this time, the transfer module 402 reads the reception date and time and the transmission source number from the control file that the facsimile reception module 401 saved to the HDD 204. Also, the transfer module 402 obtains transfer setting information, which is explained later with reference to FIG. 7, from a transfer setting management module 404. Also, the transfer module 402 transmits a transmission source number to a destination information management module 405, and obtains a registration name corresponding to the transmission source number from a telephone number of the destination information explained later with reference to FIG. 6.

Figures 5, 6, 7:
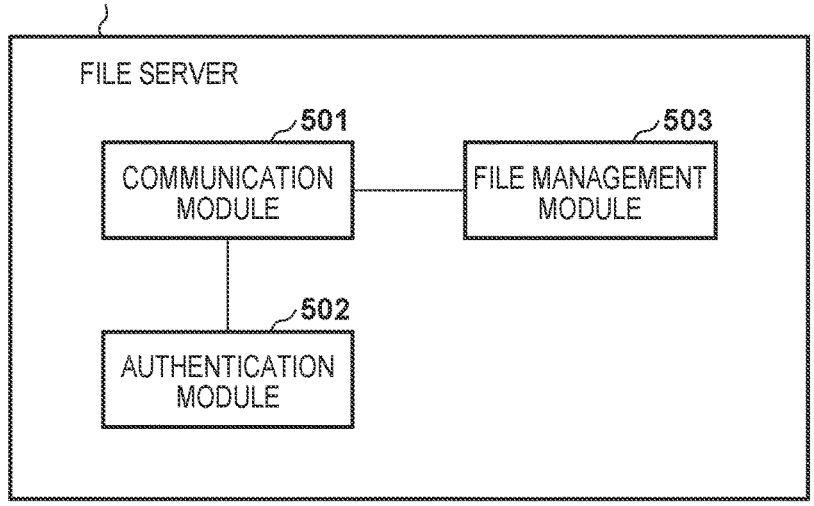
FIG. 5 is a functional block diagram for explaining a software module configuration of the file server according to the first embodiment.
FIG. 6 depicts a view for explaining an example of destination information stored in a destination information management module of the MFP according to the first embodiment.
FIG. 7 depicts a view for illustrating an example of a file storing transfer setting information stored in a transfer setting information management module of the MFP according to the first embodiment.

FIG. 6 depicts a view for explaining an example of the destination information stored in the destination information management module 405 of the MFP 110 according to the first embodiment.

The destination information is something that a user registers in advance to the destination information management module 405 via the console unit 111 of the MFP 110. From column 601 to column 603, and column 607 illustrate columns of data records of row 604 to row 606. A destination ID in the column 601 is an identifier for uniquely identifying destinations. A registration name in the column 602 indicates a user name of the destination. A telephone number in the column 603 indicates a transmission source number upon fax reception (a telephone number) corresponding to the registration name in the column 602. A destination table name in the column 607 indicates a group of a destination table (an address book) under which the destination corresponding to the registration name in the column 602 falls.

FIG. 7 depicts a view for illustrating an example of a file storing transfer setting information stored in the transfer setting management module 404 of the MFP 110 according to the first embodiment.

In this file, items set in a file server setting screen of FIG. 9, a file naming rule setting screen of FIGS. 10A and 10B, and a folder naming rule setting screen of FIG. 11 which are described later are stored. These setting screens will be explained later in detail. Note that a format of these files may be CSV, XML, or another format, and the format is irrelevant.

A hostname 701 indicates a host name of the file server 120. In the figure, "sharedserver" is designated as the host name of the file server 120. Note that an IP address of the file server 120 may be used as the host name. A folderpath 702 indicates a path that is the starting point of a storage destination folder of the transferred image file. In the figure, "root" is designated as the storage destination folder path. A username 703 indicates a login user name for authenticating towards the file server 120. In FIG. 7, "administrator" which indicates an administrator designates a login user name. A password 704 indicates a password for authenticating towards the file server 120. In the figure, "32942xc45" is designated as the password. Note that the character string of the password may be obfuscated using an encryption method such as hashing. A filenamerule 705 indicates a file naming rule when saving an image file in the file server 120. A foldernamerule 706 indicates a folder naming rule when saving an image file in the file server 120. These will be explained later in detail.

The transfer module 402 generates a file name of an image file transmitted to the file server 120 based on the filenamerule 705, the registration name, the (transmission source) telephone number, a reception date and time, the address book name, a line name, a serial number, a random number, or the like. Also the transfer module 402 generates a folder name of the image file transmitted and saved in the file server 120 based on the foldernamerule 706, the registration name, the (transmission source) telephone number, and the reception date and time. Then, the transfer module 402 reads an image file saved in the HDD 204, adds the above described file name and folder name to the image file and transmits these to the file server 120 designated by the hostname 701. Also, the transfer module 402 can perform a later explained transmission test using a telephone number and a reception date and time received from a UI module 406, and a fax document for testing saved in advance in the HDD 204 by similar processing content to the previously explained file transfer processing.

The temporary storage module 403 receives the control file and the image file and saves and manages these in the HDD 204. The transfer setting management module 404 saves and manages in the HDD 204 the transfer setting information illustrated in FIG. 7, for example, which is set by the UI module 406, which is described later. Also, the transfer setting management module 404 transmits saved transfer setting information to the transfer module 402 in accordance with a request from the transfer module 402. The destination information management module 405 saves and manages in the HDD 204 the destination information illustrated in FIG. 6, for example, which is set by the UI module 406, which is described later. The UI module 406 displays various screens on the display unit of the console unit 111 via the console unit I/F 205, and detects the content input by the user via the pointing device, the hardware keys, or the like, of the console unit 111. Also, the UI module 406 displays a status display screen which is explained later with reference to FIG. 8 on the console unit 111, and accepts user input of whether or not to perform the transfer setting. Also, the UI module 406 displays a file server setting screen which is explained later with reference to FIG. 9, obtains file server settings input by the user, transmits them to the transfer setting management module 404, and requests saving of the file server settings. Also, the UI module 406 displays to the console unit 111 a file naming rule setting screen which is explained later with reference to FIGS. 10A and 10B, obtains file naming rule input by the user, transmits them to the transfer setting management module 404, and requests saving of the file naming rule. Also, the UI module 406 displays to the console unit 111 a folder naming rule setting screen which is explained later with reference to FIG. 11, obtains a folder naming rule input by the user, transmits it to the transfer setting management module 404, and requests saving of the folder naming rule. Also, the UI module 406 displays a transmission test screen which is explained later with reference to FIG. 12 on the console unit 111, obtains a telephone number of a transmission source and a reception date and time input by the user, transmits these to the transfer module 402, and requests a transmission test.

FIG. 5 is a functional block diagram for explaining a software module configuration of the file server 120 according to the first embodiment. These software modules are stored in the HDD 306 of the file server 120, deployed into the RAM 302 upon execution, and executed under the control of the CPU 301.

A communication module 501 has a file transmission service such as SMB (Server Message Block) or WebDAV (Web-based Distributed Authoring and Versioning). The communication module 501 accepts requests via the LAN 100, performs processing, and then makes a response with the processing result. An authentication module 502 performs a client (the MFP 110 here) authentication based on authentication information included in a request to a file transmission service. A file management module 503 performs management of a file stored in the HDD 306 in response to a request to the file transmission service. The file management module 503 saves an image file in the HDD 306 or reads the image file in accordance with the folder name and the file name received from the MFP 110 through the communication module 501. Also, the file management module 503 confirms whether or not a folder of a folder name received from the MFP 110 via the communication module 501 exists in the HDD 306. Also, the file management module 503 generates folders in the HDD 306 in accordance with folder names received from the MFP 110 via the communication module 501.

Next, with reference to FIG. 7, explanation will be given for the filenamerule 705 which is a file naming rule for when saving an image file in the file server 120.

The format of the naming rule is held in the format of [item name 1] path separator symbol ("_" here) [item name 2] path separator symbol ("_" here) [item name 3]. In a case where a new item name is added, a separator "_" and an additional item name are added to the existing naming rule, for example. In a case where "an item name 4" is further added in FIG. 7, the naming rule becomes "[item name 1]_[item name 2]_[item name 3]_[item name 4], for example. Also, the item name "[REGISTNAME]" corresponds to a registration name of FIG. 6, the item name "[FAXNUMBER]" corresponds to a telephone number of a transmission source of FIG. 6, and "[DATE]" indicates a reception date and time. Also, though not shown graphically, the item name "[ADDRESSLISTNAME]" indicates a destination table, and the item name "[LINENAME]" indicates a line name using for reception of a facsimile. Also, the item name [SERIAL] indicates a serial number that the system generates, and more specifically is a numerical value such as [00000001], and a different serial numerical value is set every time there is a facsimile reception. The item name [RANDOM] indicates a random number that the system generates, which is a numerical value such as "a761232ed4211cebacd00aa0057b223" for example, and a random numerical value that is different every time there is a facsimile reception is set. In FIG. 7, "[REGISTNAME]_[FAXNUMBER]_[DATE]" is designated as the file naming rule, and in this case, "[registration name]_[telephone number] (of transmission source)_[reception date and time]" becomes the file name.

The foldernamerule 706 indicates a folder naming rule when saving an image file in the file server 120. Regarding the format of the folder naming rule, the rule is held in the format [item name 1] path separator symbol ("/" here) [item name 2] path separator symbol ("/" here) [item name 3]. When newly adding an item name, a path separator symbol ("/") and an added item name are added to the existing naming rule. For example, in a case where "the item name 4" is added, the naming rule of the folder path becomes "[item name 1]/[item name 2]/[item name 3]/[item name 4]". Also, the item name "[REGISTNAME]" indicates a registration name, the item name "[FAXNUMBER]" indicates a telephone number of a transmission source, and "[DATE]" indicates a reception date and time. In FIG. 7, "[REGISTNAME]/[FAXNUMBER]/[DATE]" is designated as the naming rule of the folder path, and "[registration name]/[telephone number]/[reception date and time]" is the folder path of the saving destination.

FIG. 8 depicts a view for illustrating an example of a status display screen displayed on the console unit 111 of the MFP 110 according to the first embodiment.

Figure 13:
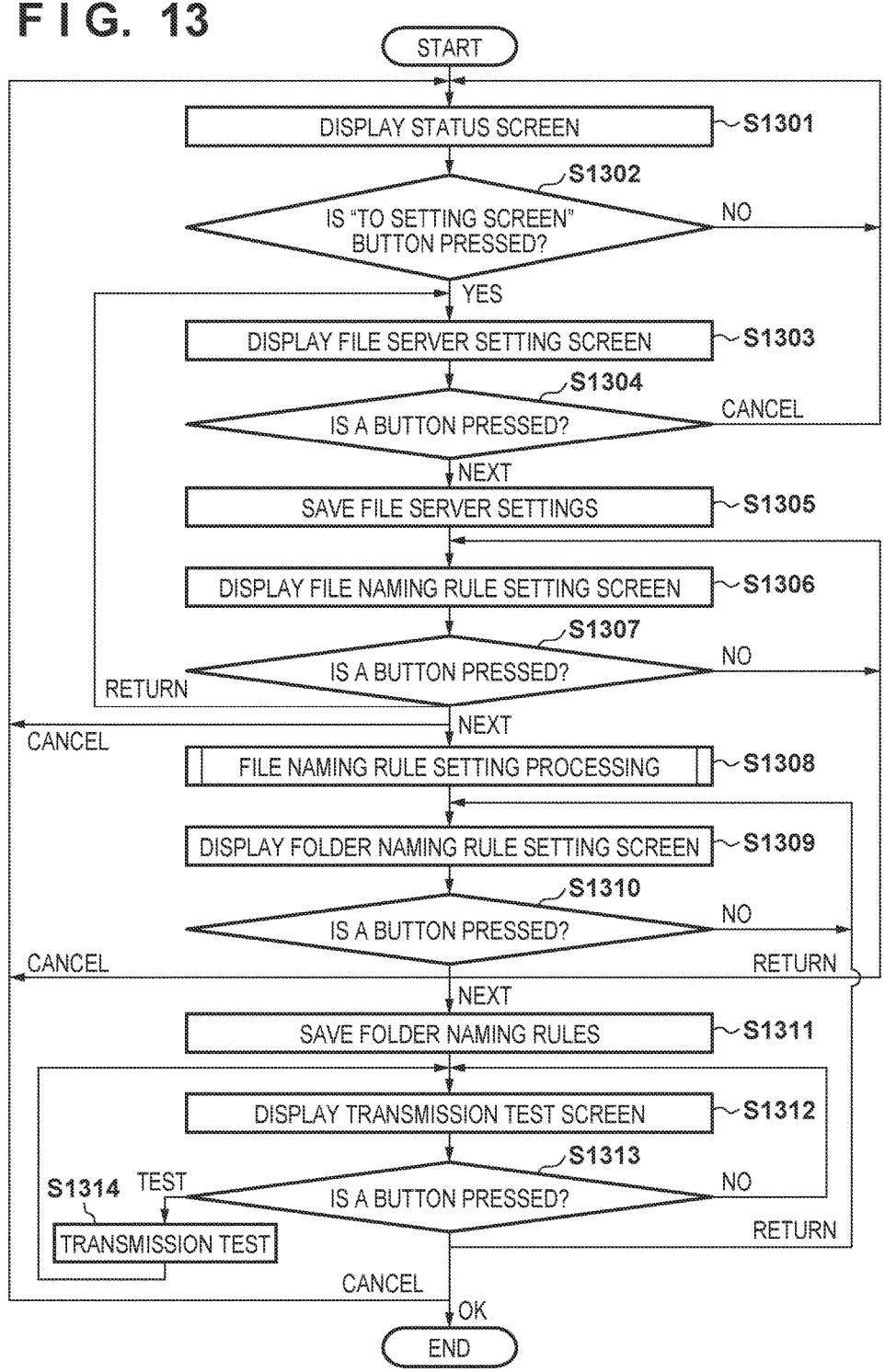
FIG. 13 is a flowchart for describing file server setting, and file naming rule and folder naming rule setting processing by the MFP according to the first embodiment.

In a status display 801, operation statuses of software modules of FIG. 4 which are operating on the MFP 110, and of the MFP 110 are displayed. When the UI module 406 performs a display of the status display screen, the UI module 406 confirms the operation statuses of the software module of the MFP 110 and the system modules. Then, the UI module 406 displays that operation is normal when the software modules of the MFP 110 and the system modules are operating normally, and displays a status of a software module or a portion thereof for which an abnormality is occurring when an abnormality is occurring. A "to setting screen" button 802 instructs to transition to a screen for changing the transfer setting information managed by the transfer setting management module 404 of the MFP 110. When the user presses (instructs) the "to setting screen" button 802, processing for changing a transfer setting explained later with reference to FIG. 13 is activated and transition is made to a file server setting screen illustrated in FIG. 9.

Note that a GUI button for updating the status display 801 in accordance with the latest statuses of the software module of the MFP 110 and the operation statuses of the modules of the MFP 110 may be arranged on the status display screen illustrated in FIG. 8.

Also in the first embodiment, configuration is made to transition to the file server setting screen in FIG. 9 when the "to setting screen" button 802 is pressed, but GUI buttons to directly transition to each screen in FIG. 10A, FIG. 10B, FIG. 11, and FIG. 12 described later may be arranged on the status display screen.

FIG. 9 depicts a view for illustrating an example of a file server setting screen that the MFP 110 according to the first embodiment displays.

A host name input box 901 is an input field for inputting a host name of the file server 120 which is a transfer destination of an image file (fax document). A name that is input into the host name input box 901 is transmitted to the transfer setting management module 404 by the UI module 406 of the MFP 110, and saved as the hostname 701 (FIG. 7) of the transfer setting information. A folder path input box 902 is an input field for inputting a folder name for the file server 120, which is a transfer destination for an image file. A name input into this input box 902 is transmitted to the transfer setting management module 404 by the UI module 406 of the MFP 110, and saved as the folderpath 702 (FIG. 7) of the transfer setting information. A login user name input box 903 is an input field for inputting a login user name that is necessary for authentication on the file server 120, which is the transfer destination of the image file. A name that is input into this input box 903 is transmitted to the transfer setting management module 404 by the UI module 406 of the MFP 110, and saved as the username 703 (FIG. 7) of the transfer setting information. A login password input box 904 is an input field for inputting a login password that is necessary for authentication on the file server which is the transfer destination of the image file. In this input box 904, "*" is displayed for input text in order to hide the content that the user inputs. The display of the input text is not limited to "*", and may be another symbol such as "●" for example; alternatively the text may be displayed without hiding it. The password input in the input box 904 is transmitted to the transfer setting management module 404 by the UI module 406 of the MFP 110, and is saved as the password 704 in the transfer setting information (FIG. 7). A cancel button 905 is a button for cancelling the changes on transfer setting information with this screen. When a user presses the cancel button 905, a transfer setting modification made via this screen is cancelled, and transition is made to the status display screen of FIG. 8.

A next button 906 is a button for changing the setting of the file server in the transfer setting information, and for instructing to transition to the file naming rule setting screen as a next screen illustrated in later described FIG. 10A. When the user presses the next button 906, the file server settings input on the file server setting screen are transmitted to the transfer setting management module 404 by the UI module 406 of the MFP 110, and the transfer setting management module 404 saves those file server settings. Then the UI module 406 transitions to a file naming rule setting screen explained later with reference to FIG. 10A and FIG. 10B.

Figure 11:
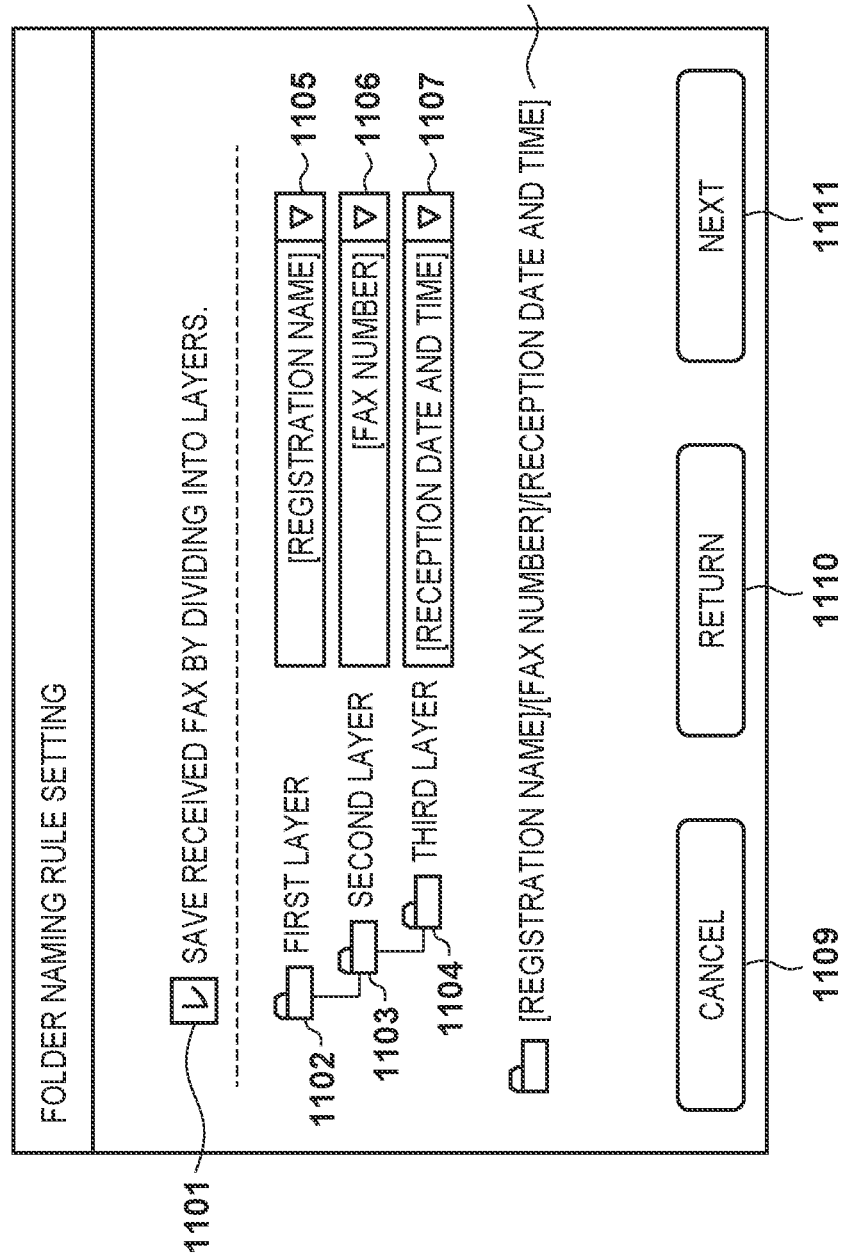
FIG. 11 depicts a view for illustrating an example of a setting screen for setting a folder naming rule that the MFP according to the first embodiment displays.
Figure 12:
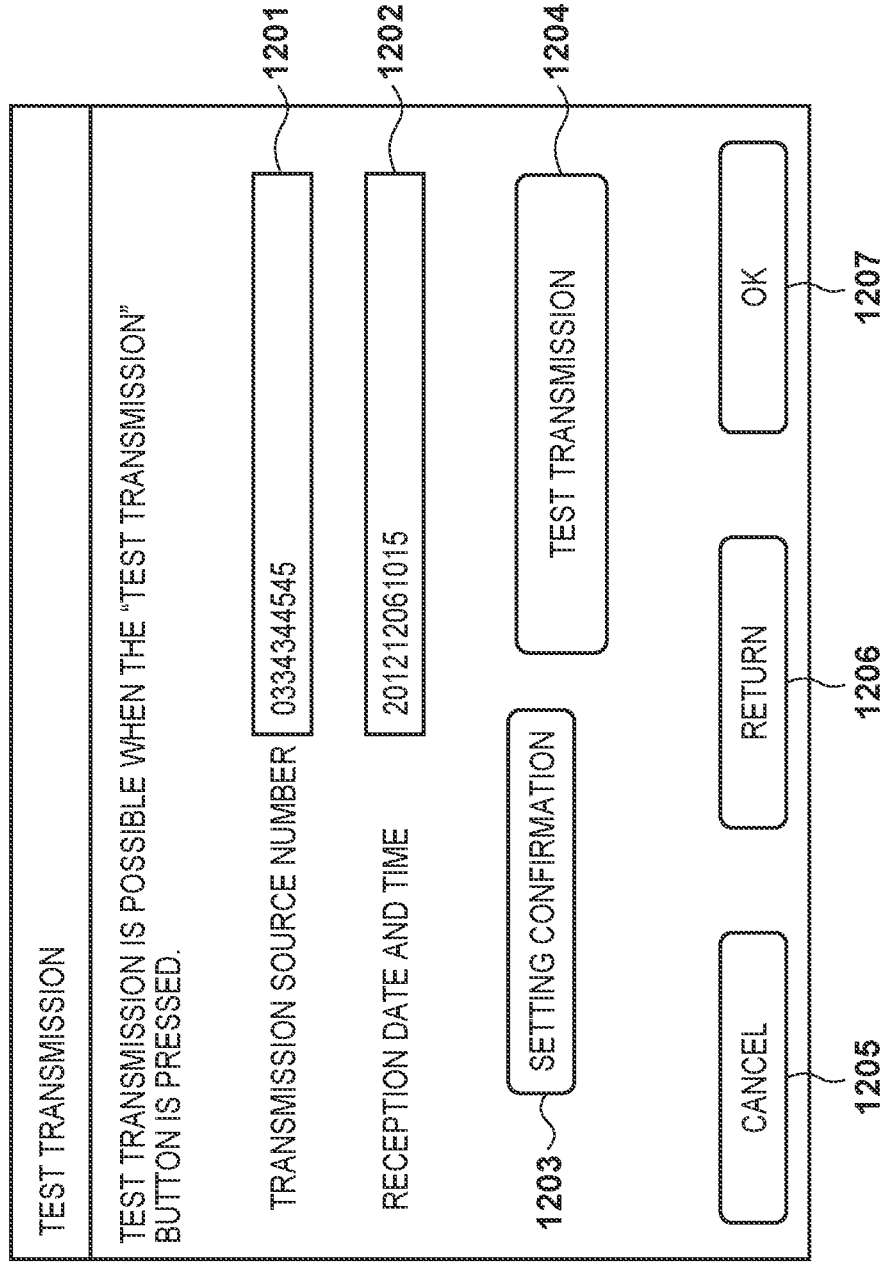
FIG. 12 depicts a view for illustrating an example of a transmission test screen that the MFP according to the first embodiment displays.

Note that in the first embodiment, transitioning to any of the file naming rule setting screens in FIG. 10A and FIG. 10B occurs when the next button 906 is pressed, but GUI buttons to directly transition to each screen in FIG. 11 and FIG. 12 may be arranged on the file server setting screen.

FIG. 10A and FIG. 10B depict views for illustrating an example of a setting screen for setting a file naming rule that the MFP 110 according to the first embodiment displays. The file name of the image file that is transferred to the file server 120 is determined in accordance with the file naming rule that the user sets via the file naming rule setting screen.

The items 1001-1003 are areas for designating item names used for the file name from among the item names of the registration name, the telephone number, the reception date and time, the address book name, the line name, the serial number and the random number; here the registration name, the telephone number and the reception date and time are selected. Here, the item 1001 indicates the first item name of the file name, the item 1002 indicates the second item name of the file name, and the item 1003 indicates the third item name of the file name. Here, a method of selecting the file name of each item is provided by a pull-down menu (not shown). As display options in each pull-down menu list, there is "none", "registration name", "fax number", "reception date and time", "address book name", "line name", "serial number", and "random number". From these options, in the first embodiment, "reception date and time", "serial number", and "random number" are information guaranteed to be unique (information that satisfies a predetermined condition).

Note that "line name" is a name registered in association with a facsimile number of the MFP 110 designated as a transmission destination. If two fax lines are connected to the modem 210 of the MFP 110, it becomes easier to understand which line facsimile data is received on if different line names are registered in association with their line numbers respectively. Note that, the line number and the line name are associated and registered to the MFP 110 in advance. Also, information of these line names may be registered as the registration name and facsimile number of the MFP 110 itself in the destination information illustrated in FIG. 6. In such a case, a name corresponding to a transmission destination facsimile number when a facsimile is received is obtained as a line name with reference to the destination information of FIG. 6.

Also, if "none" is selected in a selection item, that indicates that the selection items after that selection item are not generated. For example, if "registration name" is selected in a first selection item 1001 and "none" is selected in a second selection item 1002, it is determined that the selection items after the second selection item are not designated, and the file name is the registration name.

The item 1004 is a pull-down menu that selects a symbol of a separator that indicates a separator of each item, and as options of the separator there are "hyphen", "underscore", "space", or the like, and it is possible to select one of these as the separator. A file name preview 1005 is a preview display with which the user can confirm what kind of file name will be the result of designating the configuration of the file name by each item described above. The displayed content displays the file name in accordance with the selection items corresponding to items 1001-1004.

In FIG. 10A, a preview display of a file name when the item 1001 is designated as "registration name", the item 1002 as "fax number", the item 1003 as "reception date and time", and in the item 1004 "underscore" is designated as the separator is performed.

A cancel button 1006 instructs that details input via the setting screen be cancelled. When a user presses the cancel button 1006, transition is made to the status display screen illustrated in FIG. 8, for example. A return button 1007 instructs to return to the previous screen. When the user presses the return button 1007, transition is made to the file server setting screen illustrated in FIG. 9, for example. A next button 1008 instructs that the next screen be proceeded to. When the user presses the next button 1008, transition is made to a folder naming rule setting screen illustrated in FIG. 11, for example.

FIG. 11 is a view for illustrating an example of a setting screen for setting a folder naming rule that the MFP 110 according to the first embodiment displays. The folder name of a file saved to the file server 120 is determined in accordance with the folder naming rule set on this screen.

A radio button 1101 is a check-box for allowing a user to select whether or not to save an image file dividing into layers. When the button 1101 is checked, the folder name is generated by the folder naming rule set on this screen, and the image file is saved therein. When the button 1101 is not checked, the image file is saved directly below the folder path designated by the file server setting screen illustrated in FIG. 9.

Items 1102-1104 show layer names. Here a first layer 1102, a second layer 1103, and a third layer 1104 of the folder are included. A method for selecting the folder names corresponding to each layer is provided by pull-down menus 1105-1108. Here, as pull-down options, "none", "registration name", "fax number", "reception date and time", "address book name" and "line name" are included. Also, when "none" is selected, it is indicated that the layers after the option are not generated. For example, when "registration name" is selected for the first layer 1102 and "none" is selected for the second layer 1103, it is determined that the folder names of the second layer 1103 and thereafter are not designated, and so the folder name becomes simply "registration name". A preview display 1108 illustrates a preview display of the folder name in accordance with the selection results for the items 1102-1104. In the example of FIG. 11, because "registration name" is selected in the first layer 1102, "fax number" in the second layer 1103 and "reception date and time" in the third layer 1104, the preview display 1108 becomes "[registration name]/[fax number]/[reception date and time]".

A cancel button 1109 instructs that user operation via the setting screen be cancelled. When a user presses the cancel button 1109, transition is made to the status display screen as shown in FIG. 8, for example. A return button 1110 instructs to return to the previous screen. When the user presses the return button 1110, transition is made to a file naming rule setting screen as shown in FIG. 10A, for example. A next button 1111 instructs to transition to the next screen. When the user presses the next button 1111, transition is made to the transmission test screen illustrated in FIG. 12, for example.

FIG. 12 depicts a view for illustrating an example of a transmission test screen that the MFP 110 according to the first embodiment displays.

A transmission source number input box 1201 is an input field for inputting information used as the transmission source telephone number for when performing a transmission test. A telephone number input into the transmission source number input box 1201 is transmitted to the transfer module 402 by the UI module 406 of the MFP 110 and is used as a transmission source number (telephone number) upon a transmission test. A reception date and time input box 1202 is an input field for inputting a date/time used as a reception date and time for when performing a transmission test. A date/time input into the reception date and time input box 1202 is transmitted to the transfer module 402 by the UI module 406 of the MFP 110, and used as the reception date and time upon a transmission test.

A setting confirmation button 1203 is a button for transitioning to a setting confirmation screen (not shown) for displaying transfer setting information input via the setting screens of FIG. 9, FIGS. 10A and 10B, and FIG. 11. When the user presses the setting confirmation button 1203, in accordance with the UI module 406 of the MFP 110, the setting confirmation screen for displaying the transfer setting information input via FIG. 9, FIGS. 10A and 10B and FIG. 11 is displayed. A transmission test button 1204 is a button that instructs so as to perform a test transmission, by using the transfer setting information input via FIG. 9, FIGS. 10A and 10B and FIG. 11, and information input via the transmission source number input box 1201 and the reception date and time input box 1202. When the user presses the transmission test button 1204, the UI module 406 of the MFP 110 transmits the telephone number of the transmission source number input box 1201 and the date/time of the reception date and time input box 1202 to the transfer module 402, and a transmission test request is transmitted to the transfer module 402. At this time, the transfer module 402 assumes that a fax document was received with the received transmission source number and at the reception date and time, and performs test transmission to the file server 120. The transfer module 402 displays a transmission test result screen (not shown) for displaying the result of the test transmission when the test transmission completes.

A cancel button 1205 is a button for cancelling the transfer setting information settings. When a user presses the cancel button 1205, transition is made to the status display screen of FIG. 8. A return button 1206 is a button for transitioning to the previous screen. When the user presses the return button 1206, transition is made to the folder naming rule setting screen of FIG. 11, which is the previous screen. An OK button 1207 is a button for completing the setting of the transfer setting information, and transitioning to the status display screen as shown in FIG. 8. When the user presses the OK button 1207, the UI module 406 of the MFP 110 transitions to the status display screen as shown in FIG. 8.

Note that in the first embodiment, a transmission source number used upon testing is input via the transmission source input box 1201, and the reception date and time is input via the reception date and time input box 1202. However, an input box, an input button, or the like, may be arranged in order to designate a fax document used for another transmission test.

FIG. 13 is a flowchart for describing file server setting, and file naming rule and folder naming rule setting processing by the MFP 110 according to the first embodiment. Note that the operations (steps) illustrated in this flowchart are realized by the CPU 201 of the MFP 110 deploying a control program stored in the HDD 204 into the RAM 203, and executing the control program. Also, this flowchart is executed when a user selects a control program that executes this flowchart via the console unit 111 of the MFP 110.

Firstly, in step S1301, the CPU 201 displays a status display screen such as the one illustrated in FIG. 8, for example. Next, the processing proceeds to step S1302, and the CPU 201 determines whether or not the "to setting screen" button 802 is pressed on the status display screen. If the "to setting screen" button 802 is pressed, the processing proceeds to step S1303, and the CPU 201 displays the file server setting screen as shown in FIG. 9, for example. Then the user inputs a name, a path of a folder, or the like, of a file server which is a transfer destination, authentication information, or the like, via the file server setting screen.

Next, the processing proceeds to step S1304, the CPU 201 determines whether the user pressed the cancel button 905 or the next button 906 on the file server setting screen. If it is determined that the next button 906 has been pressed, the processing proceeds to step S1305, and if it is determined that the cancel button 905 has been pressed, the processing returns to step S1301. In step S1305, the CPU 201 stores setting information of the file server input via the file server setting screen into the HDD 204 of the MFP 110.

Next, the processing proceeds to step S1306, and the CPU 201 displays a setting screen for a file naming rule, for example as illustrated in FIG. 10A. Then the user inputs file naming rule setting information via this setting screen. Next, the processing proceeds to step S1307, and the CPU 201 determines which button the user pressed on the file naming rule setting screen of FIG. 10A. When a button is not pressed, step S1306 is executed. In step S1307, if it is determined that the next button 1008 has been pressed, the processing proceeds to step S1308. The file naming rule setting processing of step S1308 is explained later with reference to the flowchart of FIG. 18. Meanwhile, if the CPU 201 determines in step S1307 that the cancel button 1007 has been pressed, the processing proceeds to step S1301, and if the CPU 201 determines that the return button 1008 has been pressed the processing proceeds to step S1303.

Figure 18:
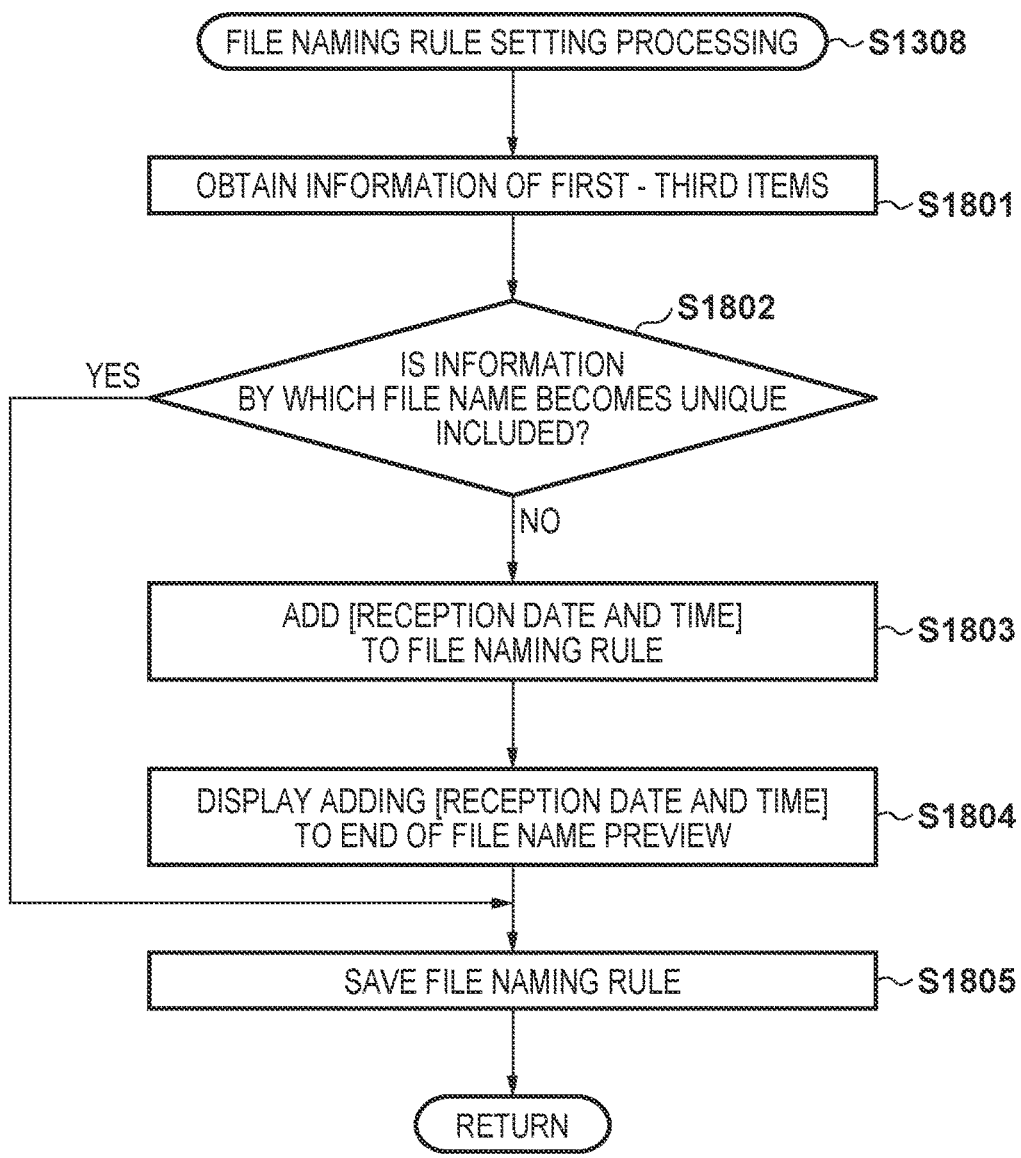
FIG. 18 is a flowchart for describing the file naming rule setting processing of step S1308 in FIG. 13.

FIG. 18 is a flowchart for describing the file naming rule setting processing of step S1308 in FIG. 13.

Firstly, in step S1801 the CPU 201, for example, obtains information set in the items 1001-1003 of the file naming rule setting screen of FIG. 10A. Next, the processing proceeds to step S1802, and the CPU 201 determines whether or not information by which the file name becomes unique is included in the information of the selection items obtained in step S1801. Note that in the first embodiment, information by which the file name becomes unique is "reception date and time", "serial number", or "random number", and in step S1802 it is determined whether or not at least one of these pieces of information is included. As in FIG. 10A, if it is determined that in one of items 1001-1003 information that will be unique (example, the reception date and time) is included, the processing proceeds to step S1805, the file naming rule set on the screen of FIG. 10A is saved, and this processing terminates.

On the other hand, if it is determined in step S1802 that information by which the file name will become unique is not included in any of items 1001-1003, as in the file naming rule setting screen of FIG. 10B, the processing proceeds to step S1803. FIG. 10B depicts a view showing an example of a case in which for the items 1001-1003, "registration name", "fax number", and "line name" are set by the user. In this case, it is determined in step S1802 that information by which the file name will become unique is not included in any of items 1001-1003. Then in step S1803, the CPU 201 automatically adds information by which the file name will become unique (for example, "reception date and time") as a fourth selection item of the file naming rule so that a unique file name can be generated. Then the processing proceeds to step S1804, and the CPU 201 displays adding [reception date and time] to the end of the file name preview 1005 as shown in FIG. 10B. Then the processing proceeds to step S1805, and the CPU 201 stores the file naming rule generated in this way to the HDD 204 of the MFP 110, and terminates this processing.

Note that in a case where [reception date and time] is added to the end of the file name preview 1005 as shown in FIG. 10B, a display color of text of [reception date and time] which was added may be changed in order to notify the user that this item was added automatically. Alternatively configuration may also be taken so as to display a message such as, for example, "reception date and time item was added" in a status bar 1010 as shown in FIG. 10B.

If as a result of adding the [reception date and time] item, the length of the character string of the file name preview 1005 becomes greater than or equal to a predetermined length, e.g. 128 characters, the next button 1008 is made so that it cannot be pressed. Configuration may also be taken to then, for example, display in the status bar 1010 a message such as "the length of the file name exceeds the maximum character string length", notifying the user that the number of characters in the file name exceeds a maximum number of characters. Once again, the explanation returns to FIG. 13.

Next, the processing proceeds to step S1309, and the CPU 201 displays a setting screen for a folder naming rule, for example as shown in FIG. 11. Then the user inputs folder naming rule setting information via this setting screen. Next, the processing proceeds to step S1310, and the CPU 201 determines which button the user pressed on the folder naming rule setting screen of FIG. 11. Here, if no button is pressed, the processing proceeds to step S1309. If it is determined that the user presses the next button 1111 in step S1310, the processing proceeds to step S1311. Also, if the user pressed the cancel button 1109 the processing proceeds to step S1301, and if the user pressed the return button 1110 the processing proceeds to step S1306. In step S1311 the CPU 201, for example, stores the information that the user input by the setting screen for the folder naming rule of FIG. 11 in the HDD 204.

Next, the processing proceeds to step S1312, and the CPU 201 displays the transmission test screen as shown in FIG. 12, for example. Next, the processing proceeds to step S1313, and the CPU 201 determines which button the user pressed on the transmission test screen. Here, if the user did not press any button, the processing proceeds to step S1312. When it is determined that the user pressed the OK button 1207, the processing terminates. However, if it is determined that the user pressed the cancel button 1205, the processing proceeds to step S1301. If it is determined that the user pressed the return button 1206, the processing proceeds to step S1310. Also, if it is determined that the user pressed the transmission test button 1204, the processing proceeds to step S1314. In step S1314, the CPU 201 executes a transmission test based on details set via the file server setting screen (FIG. 9), the file naming rule setting screen (FIG. 10A and FIG. 10B), the folder naming rule setting screen (FIG. 11), and the transmission test screen (FIG. 12), and the processing proceeds to step S1312.

Next, explanation will be given for fax reception processing by the MFP 110 according to the first embodiment. Below, explanation is given focusing on processing in which the MFP 110 receives a fax document, and transfers the fax document as an image file. Here, using previously explained transfer setting information (FIG. 7), and destination information (FIG. 6), the received fax document is transferred as an image file to the file server 120. At this time the file name and the folder name of the fax document (image file) are generated and transferred to the file server 120. Note that the destination information is already registered to the destination information management module 405 by the user in advance via the console unit 111 of the MFP 110 as shown in FIG. 6. Here, an explanation of processing for registering the destination information is omitted.

Figure 14:
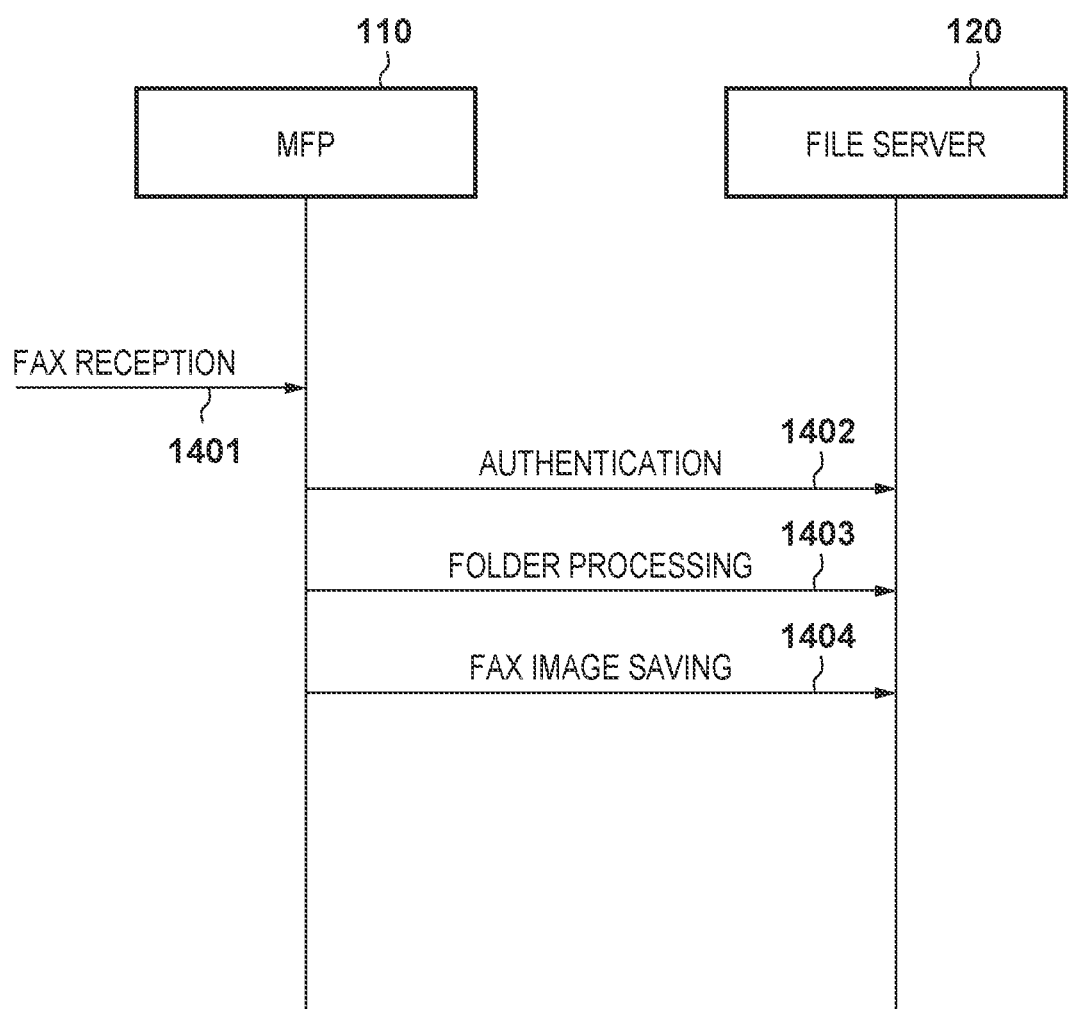
FIG. 14 is a sequence diagram for describing processing in which the MFP according to the first embodiment receives image data in a fax, and transfers an image file of the received image data to the file server.

FIG. 14 is a sequence diagram for explaining processing in which the MFP 110 according to the first embodiment receives image data (document data) in a fax, and transfers an image file of the image data that is received to the file server 120.

In reference numeral 1401, a fax image is sent from an external fax terminal to the MFP 110. When the MFP 110 receives this fax image, the facsimile reception module 401 and the transfer module 402 perform fax reception processing.

Figure 15:
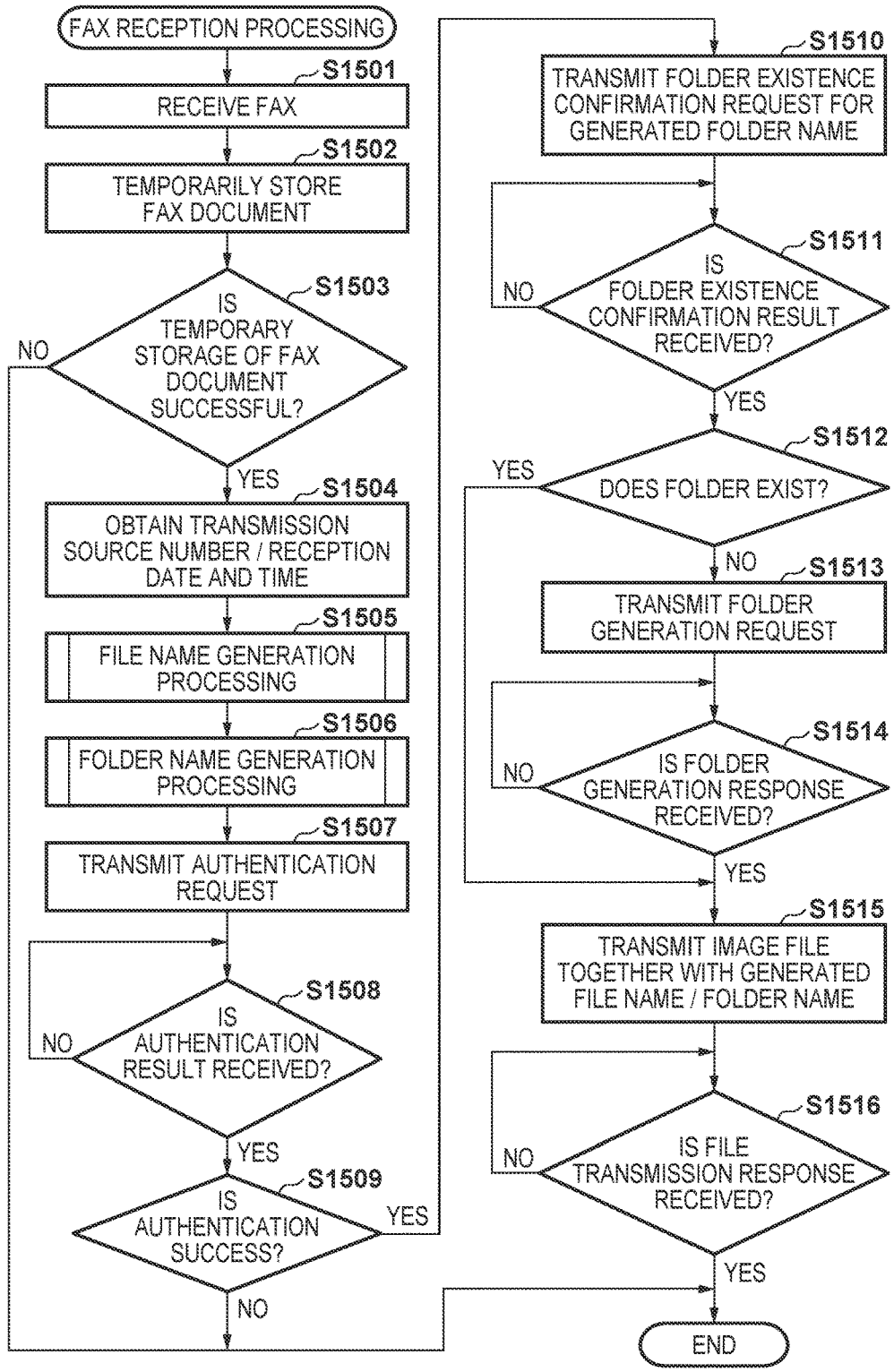
FIG. 15 is a flowchart for describing fax reception processing by the MFP according to the first embodiment.

FIG. 15 is a flowchart for describing fax reception processing by the MFP 110 according to the first embodiment. Note that the operations illustrated in this flowchart are realized by the CPU 201 of the MFP 110 deploying a control program stored in the HDD 204 into the RAM 203, and executing the control program.

Firstly, in step S1501 the CPU 201 uses the modem 210 to receive a fax document from an external fax terminal via the public switched telephone network 150. Also, the CPU 201 obtains a telephone number of the external fax terminal as a transmission source number using the modem 210, and further obtains a date/time at which the fax reception is performed as the reception date and time. Next, the processing proceeds to step S1502, and the CPU 201 converts the fax document received in step S1501 into an image file such as a PDF. Also, the CPU 201 generates a control file in which the telephone number of the transmission source and the reception date and time obtained in step S1501 are recited. Then, an image file including the fax document is temporarily stored in the HDD 204 along with the control file.

Next, the processing proceeds to step S1503, and the CPU 201 determines whether or not the temporary storing of the image file to the HDD 204 succeeded. If it was possible to store the file, the processing proceeds to step S1504, and the CPU 201 obtains the transmission source telephone number, the reception date and time, or the like, stored temporarily on the HDD 204. Meanwhile, if the temporary storing of the image file failed, error processing is performed, and the processing completes. An example of when the temporary storing fails is when there is insufficient capacity in the HDD 204. Also, in the error processing here, together with causing the printer unit 113 to print the fax document by transmitting it to the printer unit 113 via the printer I/F 209, an error status is caused to be displayed by displaying the status display screen (FIG. 8) on the console unit 111.

Next, the processing proceeds to step S1505, and the CPU 201 generates a file name when transferring the image file to the file server 120 referencing the transmission source number and the reception date and time obtained in step S1504, the transfer setting information (FIG. 7), and the destination information (FIG. 6). Explanation is given with reference to the flowchart of FIG. 16 for details of processing of step S1505.

Figure 16:
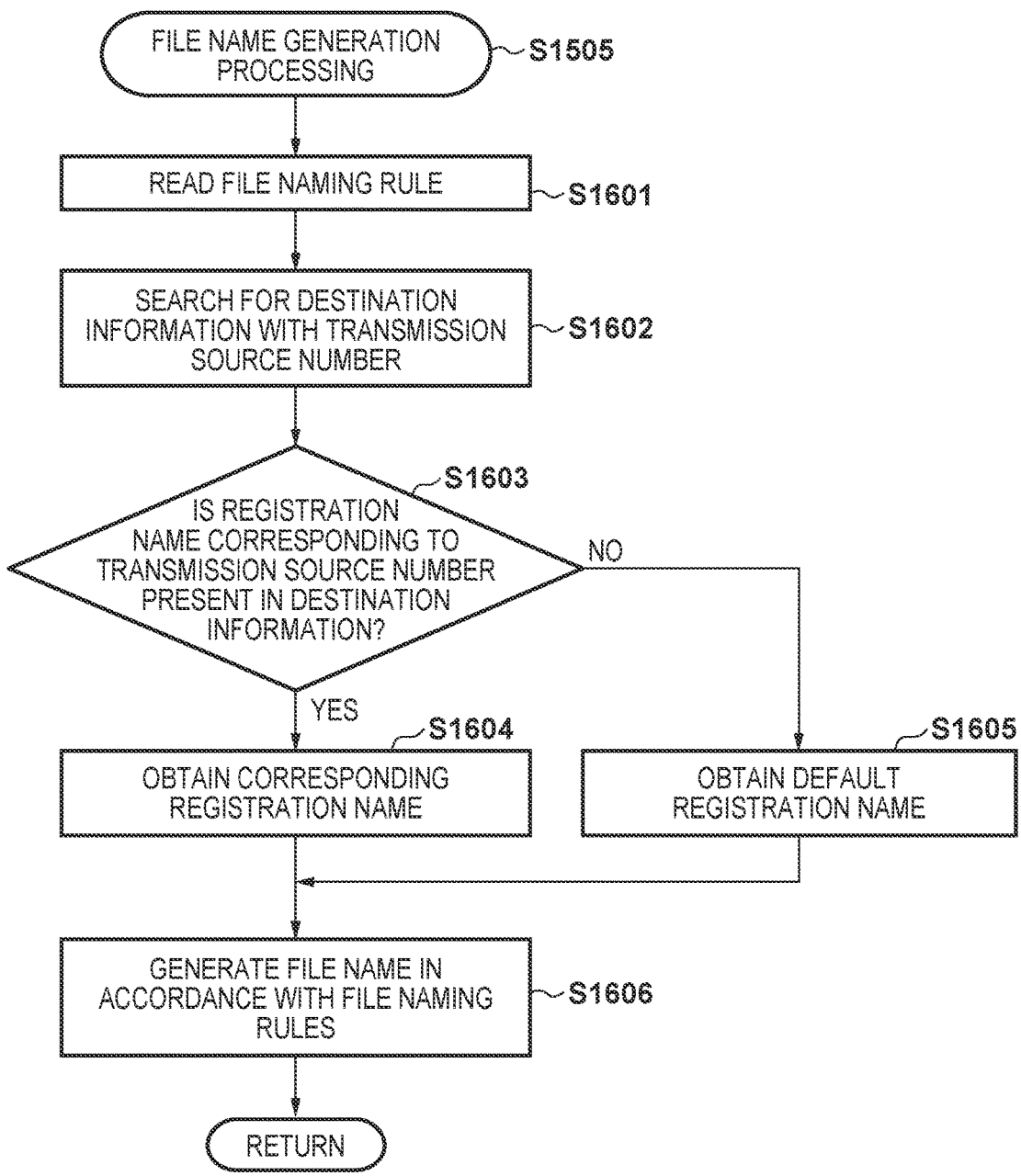
FIG. 16 is a flowchart for describing file name generation processing in step S1505 of FIG. 15 for an image file transferred.

FIG. 16 is a flowchart for describing file name generation processing in step S1505 of FIG. 15 for an image file transferred. Note that the operations illustrated in this flowchart are realized by the CPU 201 of the MFP 110 deploying a control program stored in the HDD 204 into the RAM 203 and executing the control program, and the subject of these operations is explained as the CPU 201.

Firstly, in step S1601, the CPU 201 obtains the filenamerule 705 (file naming rule) saved in the HDD 204. Next, the processing proceeds to step S1602, and the CPU 201 obtains destination information (FIG. 6) based on the telephone number. Here, the destination information is obtained by searching the registration name in the column 602 with the telephone number in the column 603 as a key. Next, the processing proceeds to step S1603, and the CPU 201 determines whether or not the registration name corresponding to the telephone number exists. When the registration name exists, the processing proceeds to step S1604, the corresponding registration name is obtained, and the processing proceeds to step S1606. On the other hand, if the registration name does not exist, the processing proceeds to step S1605, and the CPU 201 obtains a default registration name set in advance, and the processing proceeds to step S1606. Note, an example of this default registration name is when "not available", or the like, is set. Also, the default registration name may be saved in advance in the ROM 202 or the HDD 204. Also, configuration may be taken such that an input box for setting the default registration name is arranged on the file naming rule setting screen of FIG. 10A or FIG. 10B, for example, and the user is able to change the default name. In step S1606, the CPU 201 generates a file name using the registration name, the telephone number of the transmission source, the reception date and time, the address book name, the line name, or the like, in accordance with the file naming rule obtained in step S1601.

Then, the processing proceeds to step S1506 of FIG. 15. In step S1506, the CPU 201 generates the folder name for transferring based on the telephone number of the transmission source and the reception date and time obtained in step S1504, the transfer setting information (FIG. 7) and the destination information (FIG. 6). Explanation is given with reference to the flowchart of FIG. 17 for details of processing of step S1506.

FIG. 17 is a flowchart for describing folder name generation processing in step S1506 of FIG. 15 of the file server 120 on which the image file transferred is stored. Note that the operations illustrated in this flowchart are realized by the CPU 201 of the MFP 110 deploying a control program stored in the HDD 204 into the RAM 203 and executing the control program, and the subject of these operations is explained as the CPU 201.

Firstly, in step S1701, the CPU 201 obtains the foldernamerule 706 saved in the HDD 204. Next, the processing proceeds to step S1702, and the CPU 201 obtains destination information, and obtains the corresponding registration name by searching for it using the telephone number obtained in step S1504 as the key. Then, the processing proceeds to step S1703, and the CPU 201 determines whether or not a registration name corresponding to the telephone number exists. When it is determined that it does exist, the processing proceeds to step S1704, and the CPU 201 obtains the corresponding registration name, and the processing proceeds to step S1706. Meanwhile, in step S1703, if it is determined that the registration name corresponding to the telephone number does not exist, the processing proceeds to step S1705, and the CPU 201 obtains the default the registration name set in advance, and the processing proceeds to step S1706. Note, an example of the default registration name is when "not available", or the like, is set. Also, the default registration name may be saved in advance in the ROM 202 or the HDD 204. Also, configuration may be taken such that an input box for setting the default registration name is arranged on the folder naming rule setting screen of FIG. 11, for example, and so that the default name saved in the HDD 204 can be modified by user input.

In step S1706, the CPU 201 generates a folder name using the registration name, the telephone number of the transmission source, and the reception date and time in accordance with the foldernamerule 706 obtained in step S1701. Then, the processing proceeds to step S1707, and the CPU 201 sets the folder path to the head of the folder name, and the processing completes.

Next, once again the explanation returns to FIG. 14, and in reference numeral 1402, the MFP 110 performs authentication processing on the file server 120. This authentication processing is executed from step S1507 of FIG. 15.

In step S1507 of FIG. 15, the CPU 201 reads the transfer setting information (FIG. 7) from the HDD 204, and obtains the hostname 701, the username 703, and the password 704. Then, in the CPU 201, the address designated by the hostname 701 is accessed, and the username 703 and the password 704 are transmitted to the file server 120 along with the authentication request as the user name and the password respectively. Then, the processing proceeds to step S1508.

Once again, the explanation returns to FIG. 14. In reference numeral 1402, when the communication module 501 of the file server 120 receives an authentication request from the MFP 110, the communication module 501 obtains the user name and the password from the authentication request and transmits them to the authentication module 502. The authentication module 502 performs a verification of the user ID and the password using authentication information saved in the HDD 306, and transmits the result of the authentication to the communication module 501. With this, the communication module 501 transmits the received authentication result to the MFP 110.

In this way, in step S1508 of FIG. 15, the CPU 201 determines whether or not the authentication result is received from the file server 120. When it is determined that the authentication result is not received, step S1508 is executed, and when the authentication result is received, the processing proceeds to step S1509, and the CPU 201 determines whether or not the authentication result received in step S1508 is an authentication success. If the CPU 201 determines that it is an authentication success, the processing proceeds to step S1510, and if that is not the case, error processing is performed, and the processing terminates. In this error processing, a status display screen (FIG. 8) is displayed to the console unit 111, causing an error status to be displayed.

In reference numeral 1403 of FIG. 14, in a case where the MFP 110 succeeds at authentication, if a query as to whether or not a folder of the folder name generated in step S1506 exists on the file server 120 is made and no such folder exists, processing is performed to request generation of the folder. Here, the MFP 110 executes the processing of step S1510 of FIG. 15.

In step S1510, the CPU 201 transmits the folder name generated in step S1506 to the file server 120, and transmits an existence confirmation request for the file of the folder name.

Then, when, in reference numeral 1403 of FIG. 14, the communication module 501 of the file server 120 receives an existence confirmation request for the folder from the MFP 110, the communication module 501 transmits the folder name included in the folder existence confirmation request to the file management module 503, requesting folder existence confirmation processing. With this, the file management module 503 determines whether or not the folder of the received folder name exists in the HDD 306, and transmits the confirmation result to the communication module 501 as the folder existence confirmation result. With this, the communication module 501 transmits the folder existence confirmation result to the MFP 110. Then, the processing proceeds to step S1511 of FIG. 15.

In step S1511, the CPU 201 determines whether or not the folder existence confirmation result is received from the file server 120. When it is determined that the folder existence confirmation is not received, once again the processing proceeds to step S1511. When, in step S1511, it is determined that the folder existence confirmation is received, the processing proceeds to step S1512. In step S1512, the CPU 201 determines whether or not the folder having the folder name generated in step S1506 exists on the file server 120 based on the folder existence confirmation received in step S1511. Here, if it is determined that a folder of the same name exists, the processing proceeds to step S1515, and if it is determined that a folder of the same name does not exist, the processing proceeds to step S1513.

In step S1513, the CPU 201 transmits the folder name generated in step S1506 to the file server 120, thereby performing a folder generation request.

Once again, the explanation returns to FIG. 14, and when, in reference numeral 1403, the communication module 501 of the file server 120 receives the folder generation request from the MFP 110, the communication module 501 transmits the folder name included in the folder generation request to the file management module 503, requesting the generation of the folder of the folder name. The file management module 503 generates the folder having the received folder name in the HDD 306, and transmits a response that it was generated to the communication module 501. When the communication module 501 receives the folder generated response, the communication module 501 transmits a folder generated response to the MFP 110.

In step S1514, the CPU 201 determines whether the folder generated response is received from the file server 120. When the folder generated response is not received, step S1514 is executed, and when the folder generated response is received, the processing proceeds to step S1515. In step S1515, the CPU 201 reads the fax document stored on the HDD 204, and transmits the file name generated in step S1505 along with the folder name generated in step S1506 to the file server 120, thereby transmitting a file save request.

This corresponds to reference numeral 1404 of FIG. 14. In reference numeral 1404, the MFP 110 transmits a fax document (image file), designating the file name generated in step S1505, and the folder name generated in step S1506 to the file server 120. When, in this way, the communication module 501 of the file server 120 receives the file save request, the file, the folder name, and the file name are obtained from the file save request. Then, the communication module 501 transmits the obtained file, folder name, and file name to the file management module 503, and requests storage of the designated folder name and file name. The file management module 503 stores the received file in a designated location at the folder name and the file name in the HDD 306, and transmits a storage response to the communication module 501. The communication module 501 transmits the storage response to the MFP 110 as a file transmission response.

In this way, the CPU 201 determines whether or not the file transmission response is received from the file server 120 in step S1516 of FIG. 15. If the file transmission response is not received, the processing once again proceeds to step S1516, and if the file transmission response is received, the processing completes.

By virtue of the above explained processing, when the MFP 110 receives a fax, the MFP 110 generates a file name for the received image file (fax document) in accordance with a file naming rule of the transfer setting information, a transmission source number, a reception date and time, and registration name of destination information corresponding to the transmission source number. Also, the MFP 110 generates a folder name in accordance with a folder path and a folder naming rule of the transfer setting information, a transmission source number, a reception date and time, and a registration name, or the like, of destination information corresponding to a transmission source number. Also, the MFP 110 performs an existence confirmation for the folder that is to be generated towards the file server 120, and if the same folder does not exist on the file server 120, the image file is stored at the location of the generated folder name and file name having performed a folder generation request.

By the first embodiment, as explained above, by setting a file naming rule and a folder naming rule in advance, it is possible to store an image file received in a fax in a desired folder on a file server by adding a desired file name to the image file. Also for the file naming rule and the folder naming rule, it is possible to search for destination information using a telephone number of the transmission source of a received fax, and to obtain and use a registration name corresponding to the destination information. Also, in the file naming rule, it is possible to set a separator as a separation of the items. Furthermore, with the file naming rule, it is possible for the file name to be unique and in a form that the user can recognize. With this, it is possible to increase file name setting flexibility and to improve work efficiency for the user.

Also, because it is possible to generate a desired folder on the file server on which the image file is saved and save the file in the folder, there is the effect that the effort of the user searching for the desired image file can be reduced.

[Second Embodiment]

In the first embodiment as described above, the file naming rule setting processing illustrated in the flowchart of FIG. 18 is performed, but as a second embodiment, an example in which setting processing control that differs from the previously described first embodiment is performed is explained with reference to FIG. 19 to FIG. 21. Note that because the MFP, the system configuration, or the like according to a second embodiment are the same as in the previously described first embodiment, explanation thereof is omitted.

Figure 19:
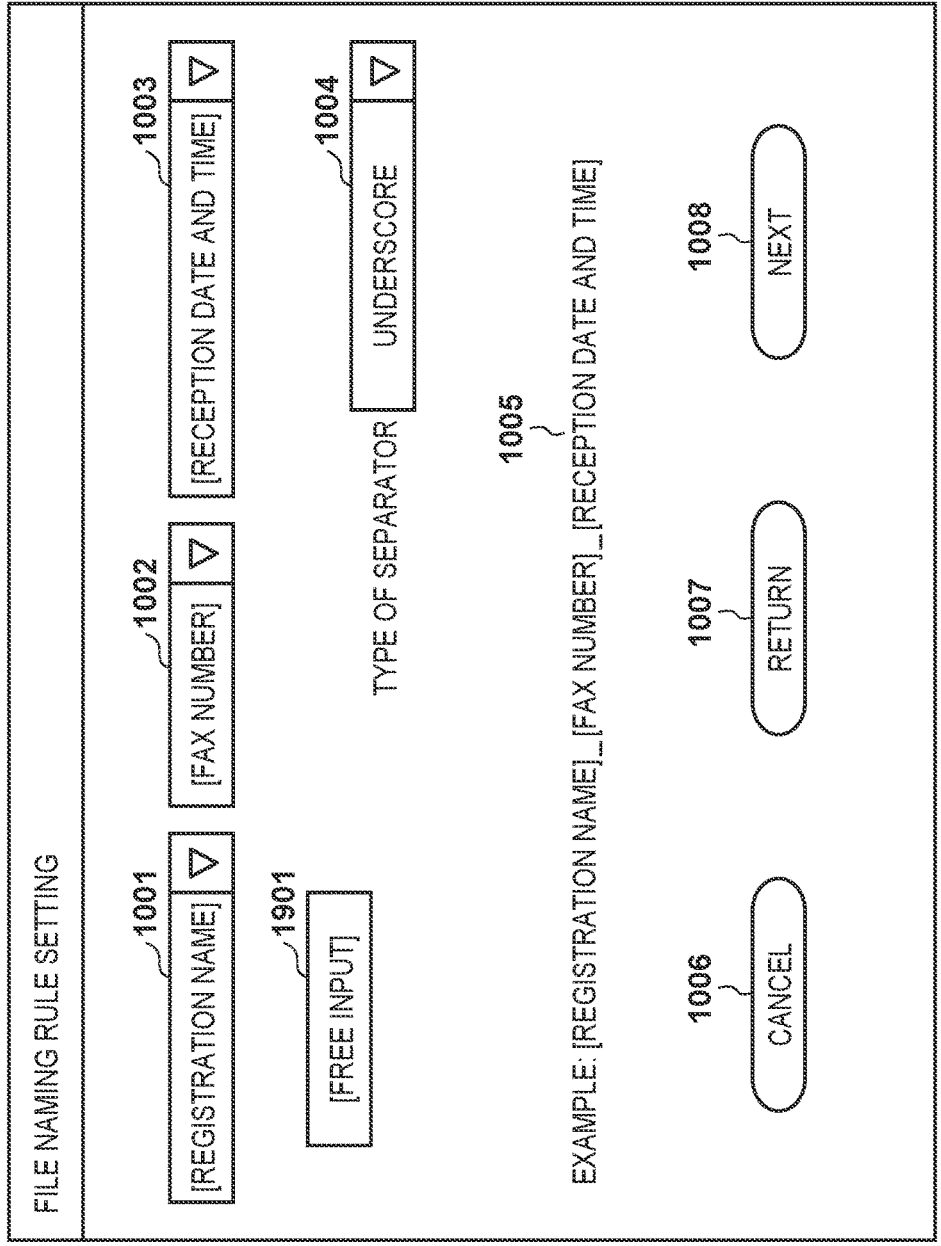
FIG. 19 depicts a view for illustrating an example of the file naming rule setting screen according to a second embodiment of the present invention.

FIG. 19 depicts a view for illustrating an example of the file naming rule setting screen according to a second embodiment of the present invention. Note that in FIG. 19 portions that are common to the file naming rule setting screen of FIG. 10A in accordance with the previously described first embodiment are denoted by the same reference numerals and explanation thereof is omitted.

In FIG. 19, a free input button 1901 is added to the file naming rule setting screen of the previously explained FIG. 10A. When a user presses the free input button 1901, the free input screen of FIG. 20 is displayed.

FIG. 20 depicts a view for illustrating an example of a free input screen according to a second embodiment of the present invention.

In a text box 2001, an initial display of information set in the selection items 1001-1003 is performed. Here, a user, using alphabetic character keys, numeric keys, or the like, that are displayed on this screen, can input as change target selection item information a character string such as, for example, "serial number", "random number", "line name" or the like into the text box 2001. Then, when the user presses an OK button 2002, the file naming rule setting screen of FIG. 19 is returned to, and the information of the selection items 1001-1003 is changed to the information input by the text box 2001. Then, the information of the file naming rule input by the text box 2001 is displayed on the file name preview 1005. Meanwhile, when the user presses a cancel button 2003, the file naming rule setting screen of FIG. 19 is returned to without changing anything.

Figure 21:
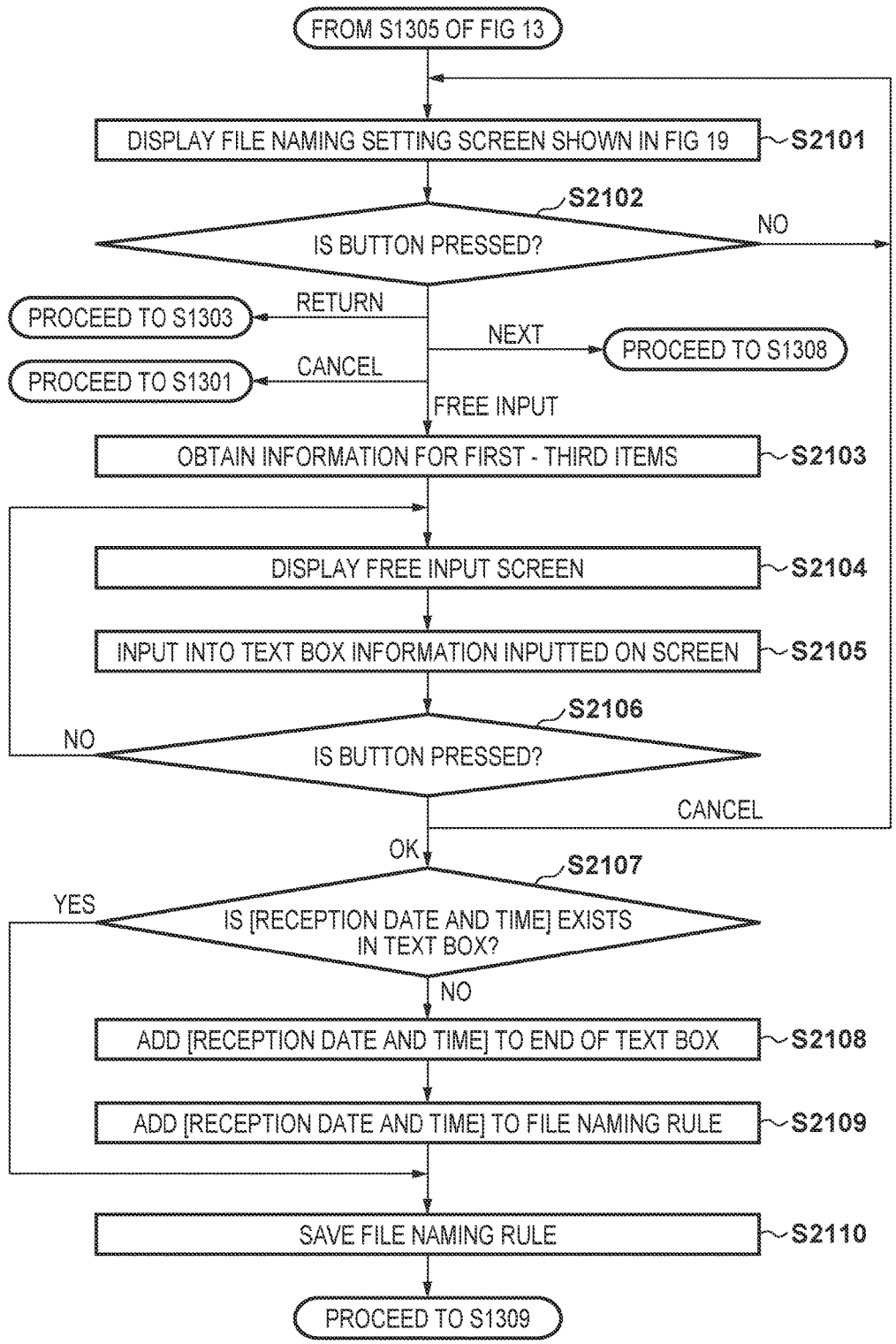
FIG. 21 is a flowchart for describing file naming rule setting processing according to the second embodiment of the present invention.

FIG. 21 is a flowchart for describing file naming rule setting processing according to the second embodiment of the present invention. Here, a form that is incorporated into the flowchart of FIG. 13 in accordance with the previously described first embodiment is represented.

The processing proceeds to step S2101 of FIG. 21 from step S1305 of FIG. 13, and the CPU 201 displays to the display unit of the console unit 111 the file naming rule setting screen illustrated in FIG. 19, for example. Then, the processing proceeds to step S2102, and the CPU 201 determines whether or not any button in the file naming rule setting screen as shown in FIG. 19 is pressed, and if a button is pressed, transition is made to processing according to the pressed button. Here, because the processing is the same as in FIG. 13, when the cancel button 1006, the return button 1007, or the next button 1008 is pressed, explanation is omitted.

When the user, in step S2102, presses the free input button 1901, the processing proceeds to step S2103. In step S2103, the CPU 201 obtains the information set in the selection items 1001-1003, the processing proceeds to step S2104, and the CPU 201 displays the free input screen as shown in FIG. 20, for example. Next, the processing proceeds to step S2105, and the CPU 201, via the free input screen, displays desired selection item information input by the user in the text box 2001. Then, in step S2106, the CPU 201 determines whether or not the OK or cancel button is pressed on the free input screen. When, in step S2106, it is determined that the OK button 2002 is pressed, the processing proceeds to step S2107, and when it is determined that the cancel button 2003 is pressed, the processing proceeds to step S2101, and the file naming rule setting screen is displayed on the display unit of the console unit 111.

For step S2107 to step S2110, the processing is the same as in step S1802 to step S1805 of previously explained FIG. 18, and so explanation is omitted. Note that in the free input screen, even if [reception date and time] is deleted during inputting of the character string into the text box 2001, in order to make the file name unique, "reception date and time" is added to the file name naming rule, and the file name naming rule is saved.

By the second embodiment, as explained above, even if there is a free input user interface, information such as "reception date and time" that will necessarily become unique can be added as a file name item to the file naming rule. With this, it is possible to maintain file names uniquely, and it is possible to increase file name setting flexibility and to improve work efficiency for the user.

[Other Embodiments]

In the first embodiment, the line name can be designated as the folder name, but configuration may be taken such that it is possible to designate the line number itself as the folder name.

In the above described embodiments, the setting screen caused setting to be performed by using a plurality of screens in a wizard format, but configuration may be taken so that all settings are possible in one screen.

Also, in the above described embodiments, the user operates the console unit 111 of the MFP 110, and setting screens are displayed on the console unit 111, but configuration may be taken such that setting screens can be operated from a general-purpose personal computer Web browser.

Also, in the first and second embodiments, when the items that configure the file name do not include information that will become unique, [reception date and time] is added as information that will become unique, but the present invention is not limited to this. For example, if it is information that will become unique such as, for example, "serial number" or "device manufacturing number", any other information being unique may be added as information that will become unique.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-247316, filed Dec. 5, 2014, which is hereby incorporated by reference herein in its entirety.

What is claimed is:

1. An information processing apparatus, comprising:
a display device configured to display a setting screen; and
processing circuitry configured to cause the information processing apparatus to:
set a first image file naming rule by setting each of a plurality of items, selected via the displayed setting screen, to configure a file name to be created using the first image file naming rule;
determine whether or not any one of the plurality of items that configure the file name to be created using the first image file naming rule makes the file name created using the first image file naming rule unique;
add, in response to a determination that none of the plurality of items that configure the file name to be created using the first image file naming rule makes the file name created using the first image file naming rule unique, an item to the first image file naming rule that makes a file name created using the first image file naming rule having the added item unique; and
save a second image file naming rule, the second image file naming rule including the first image file naming rule and the added item.

2. The information processing apparatus according to claim 1, wherein the displayed setting screen includes a list of pieces of information that can be set for each of the plurality of items, and information selected by a user from the list is set to the each of the plurality of items.

3. The information processing apparatus according to claim 1, wherein the processing circuitry is configured to cause the display device to display an input screen for inputting information that can be set for each of the plurality of items, and information input via the displayed input screen is set to the each of the plurality of items.

4. The information processing apparatus according to claim 3, wherein the displayed input screen includes a keyboard, and wherein the processing circuitry is configured to cause the display device to display a message when a number of characters of information input using the keyboard is more than a predetermined number.

5. The information processing apparatus according to claim 1, wherein the item added to the first image file naming rule is added to the first image file naming rule after the plurality of items.

6. The information processing apparatus according to claim 1, wherein the processing circuitry is configured to cause the display device to display the item added to the first image file naming rule in a color that is different from a display color of another item.

7. The information processing apparatus according to claim 1, wherein the processing circuitry is configured to cause the display device to display a message indicating that the item has been added to the first image file naming rule.

8. The information processing apparatus according to claim 1, wherein the item added to the first image file naming rule that makes the file name created using the first image file naming rule having the added item unique includes either a reception date and time or a serial number of the information processing apparatus.

9. A method of controlling an information processing apparatus, the method comprising:
setting a first image file naming rule by setting each of a plurality of items, selected via a displayed setting screen of the information processing apparatus, to configure a file name to be created using the first image file naming rule;
determining whether or not any one of the plurality of items that configure the file name to be created using the first image file naming rule makes the file name created using the first image file naming rule unique;
adding, in response to a determination that none of the plurality of items that configure the file name to be created using the first image file naming rule makes the file name created using the first image file naming rule unique, an item to the first image file naming rule that makes a file name created using the first image file naming rule having the added item unique; and
saving a second image file naming rule, the second image file naming rule including the first image file naming rule and the added item.

10. A non-transitory computer-readable storage medium storing a program for causing a computer to execute a control method for an information processing apparatus, the method comprising:
setting a first image file naming rule by setting each of a plurality of items, selected via a displayed setting screen of the information processing apparatus, to configure a file name to be created using the first image file naming rule;
determining whether or not any one of the plurality of items that configure the file name to be created using the first image file naming rule makes the file name created using the first image file naming rule unique;
adding, in response to a determination that none of the plurality of items that configure the file name to be created using the first image file naming rule makes the file name created using the first image file naming rule unique, an item to the first image file naming rule that makes a file name created using the first image file naming rule having the added item unique; and
saving a second image file naming rule, the second image file naming rule including the first image file naming rule and the added item.

* * * * *